US012763926B2

(12) United States Patent
Reddy et al.

(10) Patent No.: US 12,763,926 B2
(45) Date of Patent: Oct. 13, 2026

(54) SELECTING SECURE SEQUENCES FOR RADIO FREQUENCY COMMUNICATION AND POSITIONING APPLICATIONS

(71) Applicant: QUALCOMM Incorporated, San Diego, CA (US)

(72) Inventors: Varun Amar Reddy, San Diego, CA (US); Alexandros Manolakos, Athens (GR); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 18/728,517

(22) PCT Filed: Feb. 15, 2023

(86) PCT No.: PCT/US2023/062636
§ 371 (c)(1),
(2) Date: Jul. 12, 2024

(87) PCT Pub. No.: WO2023/172807
PCT Pub. Date: Sep. 14, 2023

(65) Prior Publication Data

US 2025/0141658 A1 May 1, 2025

(30) Foreign Application Priority Data

Mar. 8, 2022 (GR) .............................. 20220100216

(51) Int. Cl.
*H04L 9/06* (2006.01)
*G06F 7/58* (2006.01)

(52) U.S. Cl.
CPC ............ *H04L 9/0631* (2013.01); *G06F 7/582* (2013.01)

(58) Field of Classification Search
CPC ............................... H04L 9/0631; G06F 7/582
USPC .......................................................... 713/168
See application file for complete search history.

(56) References Cited

U.S. PATENT DOCUMENTS

| | | | | |
|---|---|---|---|---|
| 9,882,707 | B1 * | 1/2018 | Yeo | H04L 1/203 |
| 2010/0002877 | A1 | 1/2010 | Zhang | |
| 2012/0231802 | A1 * | 9/2012 | Ngai | H04W 72/1215 455/450 |
| 2019/0273636 | A1 * | 9/2019 | Batra | H04B 1/711 |

FOREIGN PATENT DOCUMENTS

| | | | | |
|---|---|---|---|---|
| CN | 112996002 A * | 6/2021 | | H04W 16/02 |
| EP | 3255851 A1 | 12/2017 | | |
| FR | 2880442 A1 * | 7/2006 | | G06F 11/28 |
| WO | WO-2015184910 A1 * | 12/2015 | | H04W 72/04 |

OTHER PUBLICATIONS

International Search Report and Written Opinion—PCT/US2023/062636—ISA/EPO—Jul. 6, 2023.

* cited by examiner

*Primary Examiner* — Moeen Khan
(74) *Attorney, Agent, or Firm* — QUALCOMM Incorporated

(57) ABSTRACT

Techniques are provided for securing reference signals. An example method for transmitting a signal based on a validated pseudo random sequence includes determining secure sequence validation information, generating a pseudo random sequence, validating the pseudo random sequence based on the secure sequence information, and transmitting the signal based at least in part on the validated pseudo random sequence.

30 Claims, 18 Drawing Sheets

SELECTING SECURE SEQUENCES FOR RADIO FREQUENCY COMMUNICATION AND POSITIONING APPLICATIONS

CROSS-REFERENCE TO RELATED APPLICATION

This application is the National Stage of International Application No. PCT/US2023/062636, filed Feb. 15, 2023, entitled "SELECTING SECURE SEQUENCES FOR RADIO FREQUENCY COMMUNICATION AND POSITIONING APPLICATIONS," which claims the benefit of Greek patent application No. 20220100216, filed Mar. 8, 2022, entitled "SELECTING SECURE SEQUENCES FOR RADIO FREQUENCY COMMUNICATION AND POSITIONING APPLICATIONS," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications. Some of the over-the-air (OTA) messages required to obtain the positioning information are susceptible to attack by spoofing the OTA messages. There is a need to obtain location estimates with secure OTA messaging.

SUMMARY

An example method for transmitting a signal based on a validated pseudo random sequence according to the disclosure includes determining secure sequence validation information, generating a pseudo random sequence, validating the pseudo random sequence based on the secure sequence information, and transmitting the signal based at least in part on the validated pseudo random sequence.

Implementations of such a method may include one or more of the following features. The secure sequence validation information may include a metric and a corresponding threshold value and validating the pseudo random sequence includes obtaining a measurement value of the pseudo random sequence based on the metric and comparing the measurement value to the corresponding threshold value. The metric may be an autocorrelation value. The metric may be a peak average power ratio (PAPR). The metric may be a peak-to-sidelobe measurement value. The pseudo random sequence may be based on an Advanced Encryption Standard (AES). Determining the secure sequence validation information may include exchanging one or more messages with a wireless node configured to receive the signal. Determining the secure sequence validation information may include receiving the secure sequence validation information from a network server. The signal may be a positioning reference signal. The signal may be a ultrawideband signal. Validating the pseudo random sequence may include discarding a first pseudo random sequence based on the secure sequence information, generating a second pseudo random sequence, and validating the second pseudo random sequence based on the secure sequence information. The second pseudo random sequence may be generated based on changing a counter value, a plain text value, or a combination of both, wherein the counter value and the plain text value are utilized by a cryptographic algorithm configured to generate pseudo random sequences.

An example method for receiving a signal based on a validated pseudo random sequence according to the disclosure includes determining secure sequence validation information, generating a pseudo random sequence, validating the pseudo random sequence based on the secure sequence information, and receiving the signal based at least in part on the validated pseudo random sequence.

Items and/or techniques described herein may provide one or more of the following capabilities, as well as other capabilities not mentioned. Radio frequency positioning methods are susceptible to across symbol attacks where an adversary may attempt to spoof a receiving station by transmitting a false reference signal. Cryptographic methods may be used to secure reference signals, however, the encryption process may degrade the ability of a receiving station to correlate the encrypted reference signal. The techniques provided herein overcome this limitation. In an example, a transmitting and a receiving wireless node may be configured to independently generate secure sequences. The secure sequences may be based on the advanced encryption standard (AES) or other encryption techniques. The stations may independently evaluate a secure sequence for autocorrelation properties and may reject sequences which fail to meet a threshold value. Rejected sequences may be skipped and not used for radio frequency positioning applications. The security of the reference signals may be increased, and the accuracy of the position estimates based on the reference signals may improve. Other capabilities may be provided and not every implementation according to the disclosure must provide any, let alone all, of the capabilities discussed.

DETAILED DESCRIPTION

Figure 1:
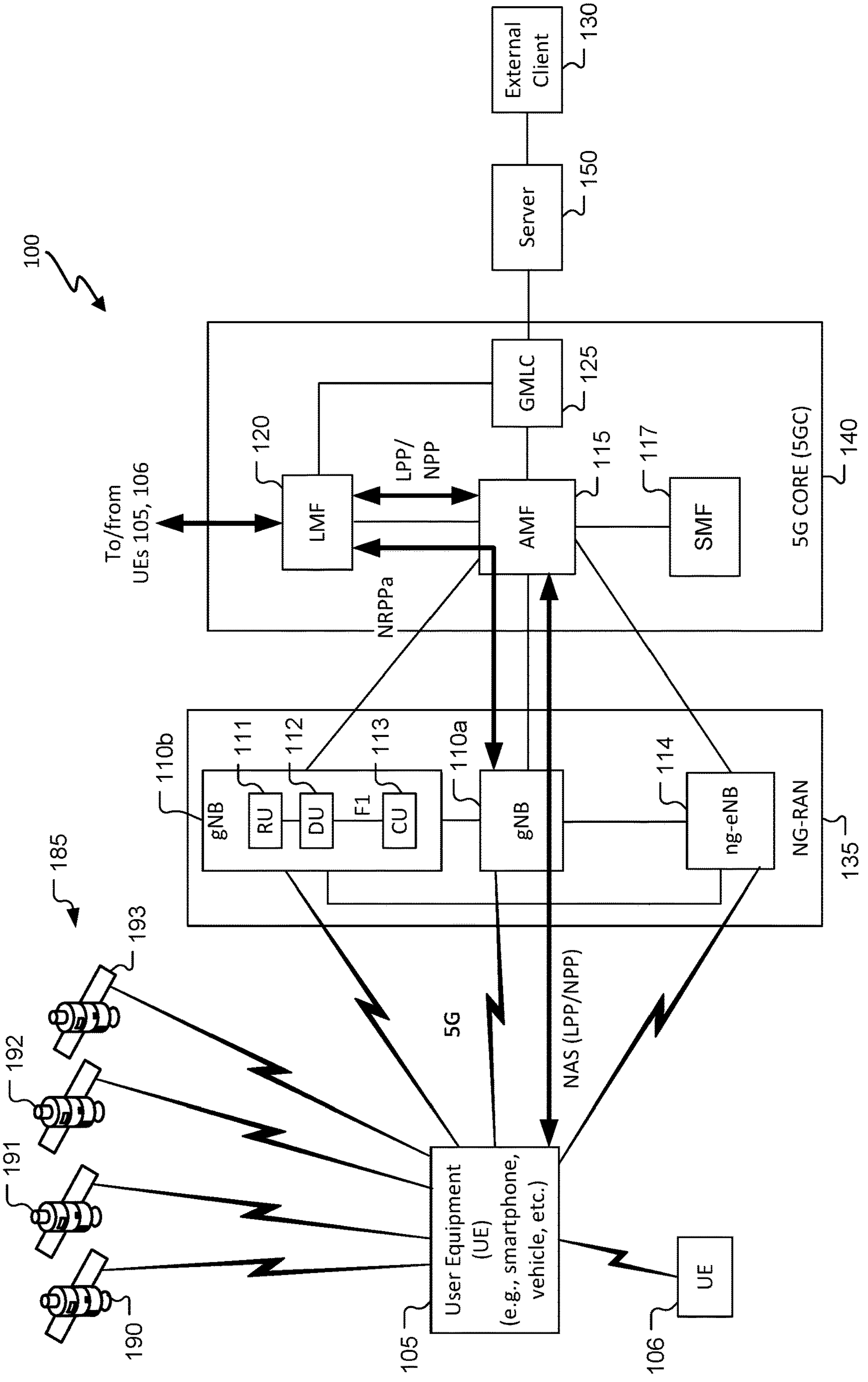
FIG. 1 is a simplified diagram of an example wireless communications system.

Techniques are discussed herein for reference signal security. For example, a radio frequency (RF) signal may be transmitted by one wireless node to another wireless node, with the RF signal including a reference signal and a preamble sequence to enable the receiving wireless node to perform a channel estimation and determine an accurate time of arrival (ToA) of the transmitted signal. The ToA may be used to estimate the position of the receiving wireless node. Some preamble sequences, however, are susceptible to over-the-air (OTA) attacks where an adversary may receive the reference signal and determine the transmission parameters. The adversary may generate a new reference signal based on the parameters to impact the ToA measurement obtained by the receiving wireless node, and a corresponding position estimate. Cryptographic methods have been proposed to improve the security of OTA transmissions, such as utilizing the Advanced Encryption Standard (AES) to generate a scrambled time stamp sequence (STS) which is included with the reference signal. These secure sequences, however, may cause significant sidelobes in autocorrelation processes used by the receiving stations to decode the OTA signal. The sidelobes impact the channel estimate and may also degrade the position estimation performance. The techniques provided herein may be used to alleviate the performance degradation by selectively discarding the secure sequences that cause an increase in the sidelobes.

In an example, the transmitting and receiving wireless nodes may be configured to generate an STS based on known cryptographic methods, such as the IEEE 802.15.47 standard. Each station utilizes a shared private key and a plain text value (e.g., the value 'V') to independently generate pseudo random numbers as a STS. The stations are then configured to validate the resulting sequences based on a predetermined metric and threshold value. For example, each station may be configured to determine an autocorrelation value for the resulting sequences and reject any sequence with an autocorrelation value that is less than 95%. Other metrics and thresholds may also be used. The transmitting station may be configured not to transmit a rejected sequence and then transmit the next validated sequence. The receiver may be configured to skip the rejected sequence and utilize the next validated sequence. A counter value may be used to modify the plain text value and thus the resulting secure sequence. Other techniques may also be used to modify the plain text value. Both the transmitter and receiver are configured to utilize the same metric and threshold to reject a secure sequence, and the same processes to generate the next secure sequence. Other configurations, however, may be used.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," a "wireless node," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrow band Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network: NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, Ultrawideband (UWB), etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*a* includes an RU 111, a DU 112, and a CU 113. The RU 111, DU 112, and CU 113 divide functionality of the gNB 110*a*. While the gNB 110*a* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*a*. The DU 112 hosts the Radio Link Control (RLC), Medium Access Control (MAC), and physical layers of the gNB 110*a*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*a*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QOS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*. 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
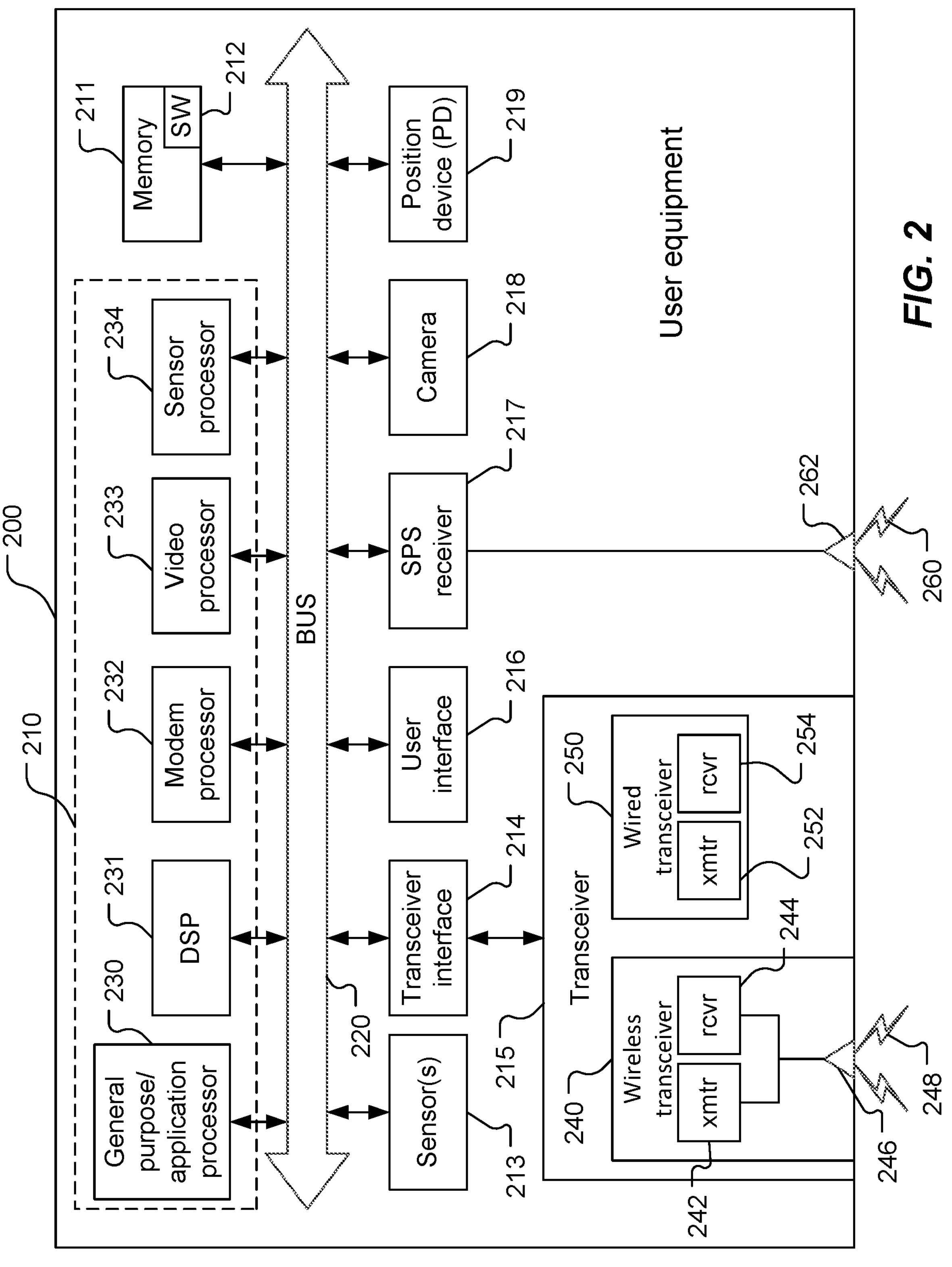
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
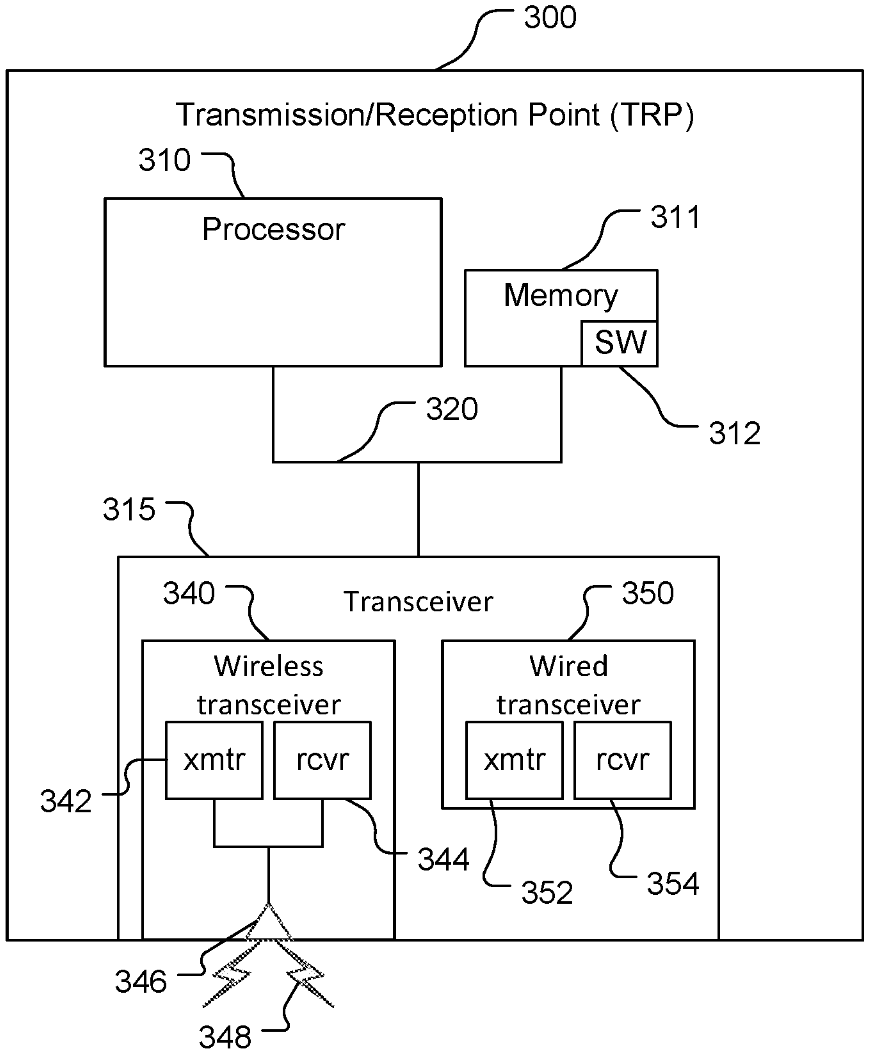
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions). In general, the TRP 300 may be considered a wireless node in that it may communicate with other wireless nodes via OTA signals.

Figure 4:
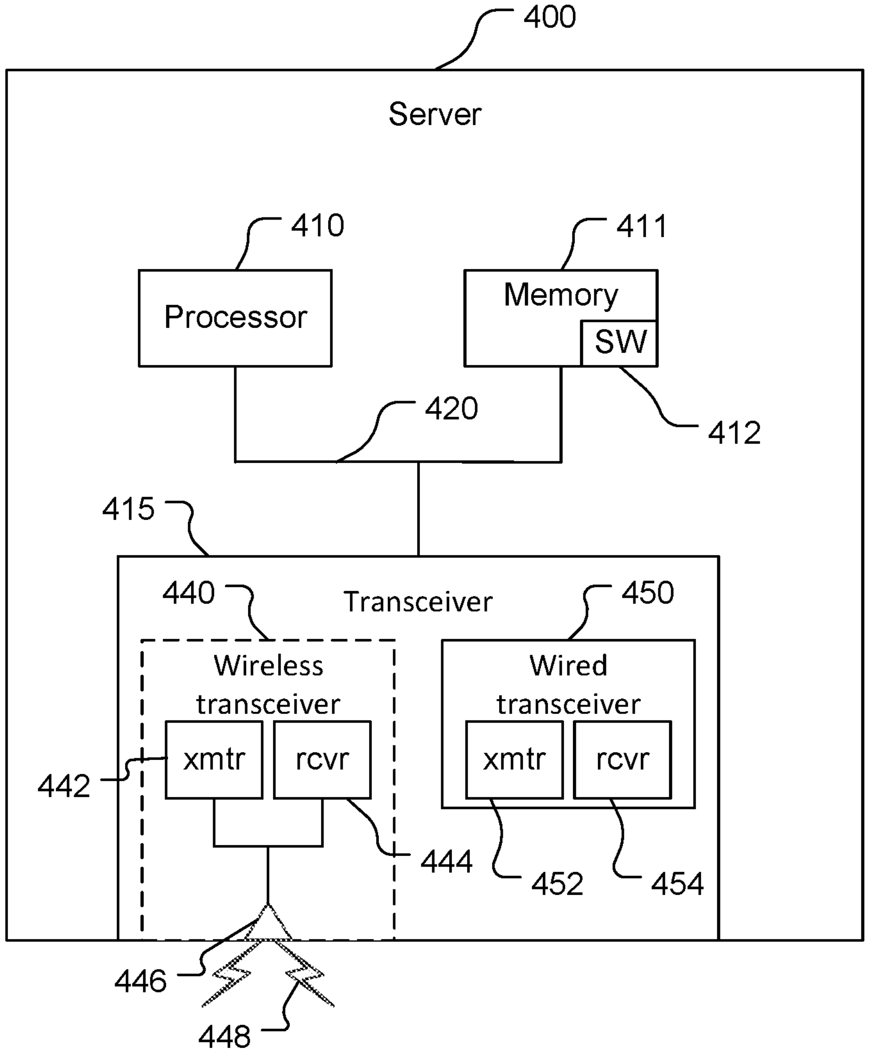
FIG. 4 is a block diagram of components of a server, various examples of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below:

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
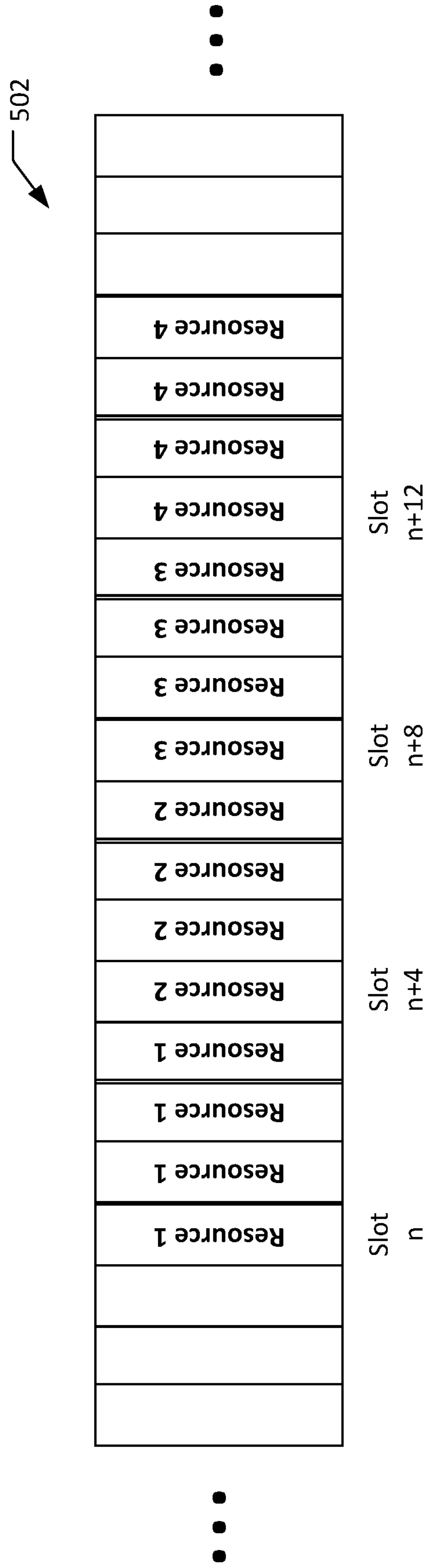
FIGS. 5A and 5B illustrate example downlink positioning reference signal resource sets.
Figure 5B:
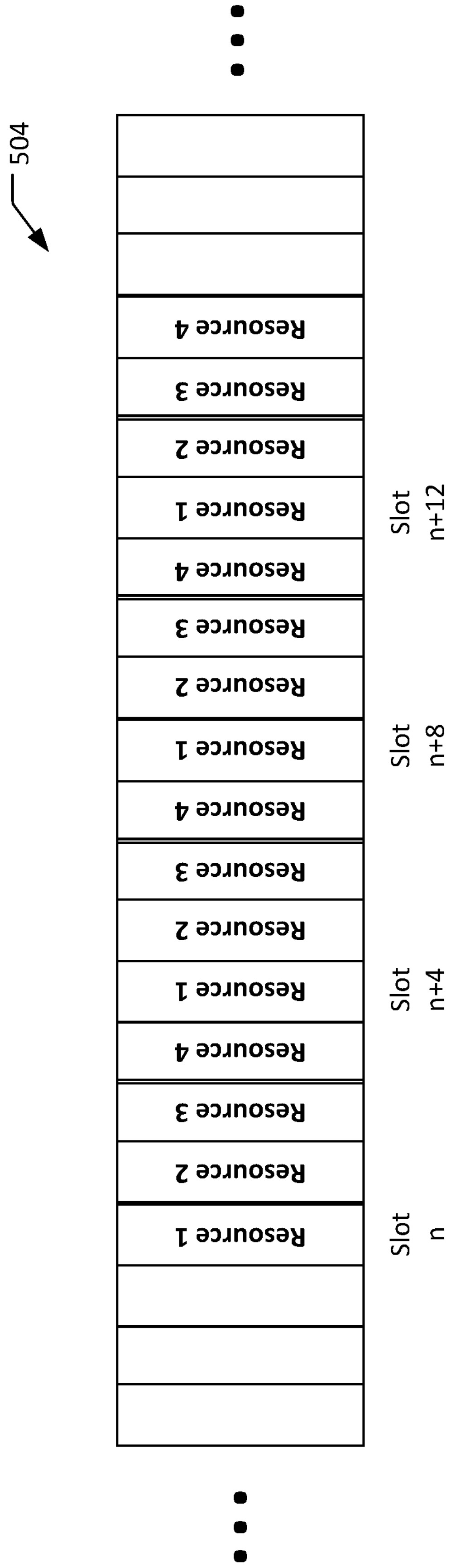

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting. A single instance of a PRS Resource Set as shown in FIG. 5A and FIG. 5B may also be referred to as a "PRS occasion".

Figure 6:
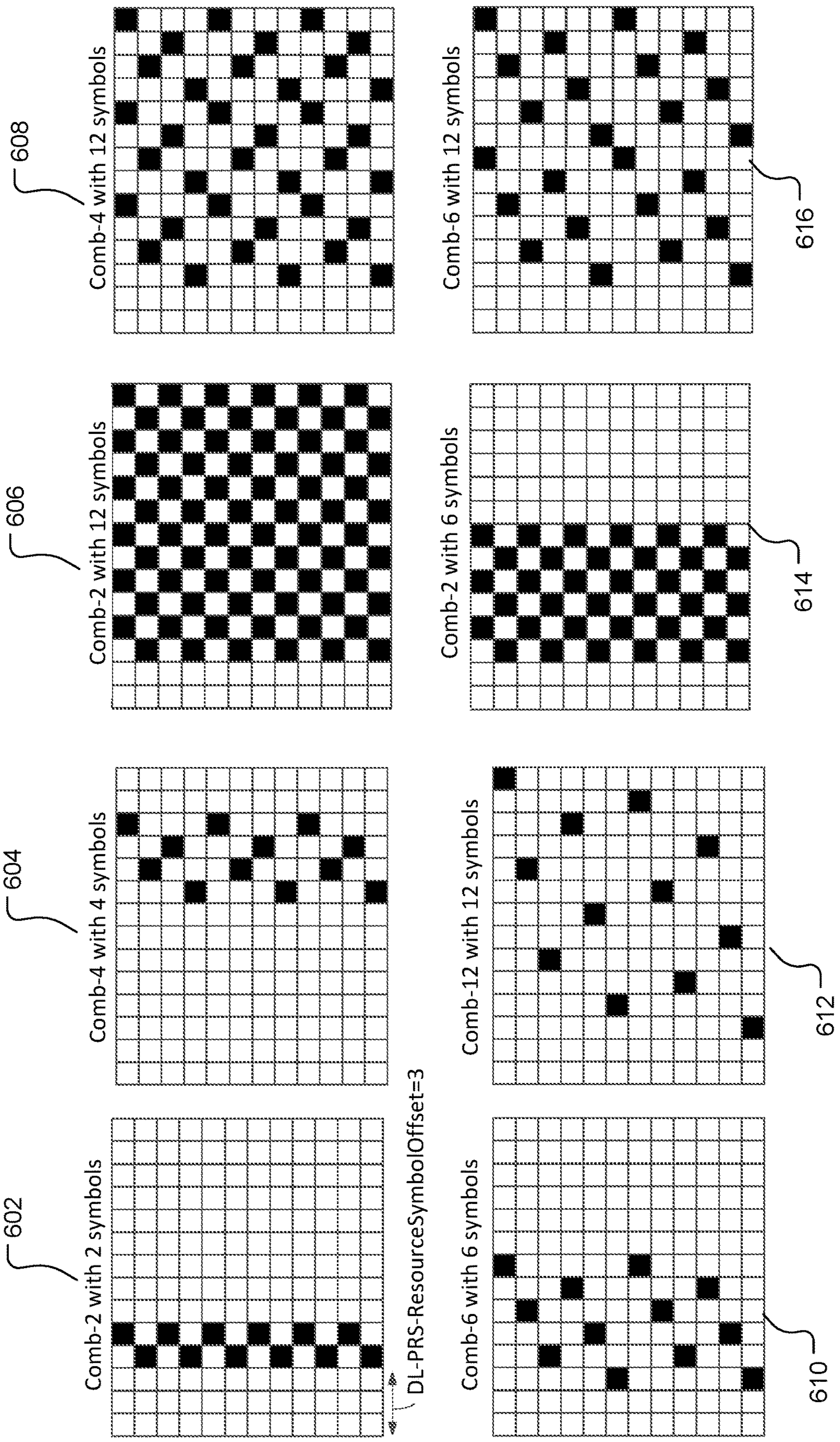
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. Typically, a base station may transmit the PRS from antenna port 5000 on one or more slots in each subframe configured for PRS transmission.

A base station may transmit the PRS over a particular PRS bandwidth, which may be configured by higher layers. A PRS Resource may be located anywhere in the frequency grid. A common reference point for the PRS may be defined as "PRS Point A". The "PRS Point A" may serve as a common reference point for the PRS resource block grid and may be represented by an Absolute Radio Frequency Channel Number (ARFCN). The PRS Start Physical Resource Block (PRB) may then be defined as a frequency offset between PRS Point A and the lowest subcarrier of the lowest PRS resource block expressed in units of resource blocks. The base station may transmit the PRS on subcarriers spaced apart across the PRS bandwidth.

The base station may also transmit the PRS based on the parameters such as PRS periodicity, PRS Resource Set Slot Offset, PRS Resource Slot Offset, PRS Resource Repetition Factor and PRS Resource Time Gap. PRS periodicity is the periodicity at which the PRS Resource is transmitted in number of slots. The PRS periodicity may depend on the subcarrier spacing (SCS) and may be, for example, $2^{\mu}\{4, 5, 8, 10, 16, 20, 32, 40, 64, 80, 160, 320, 640, 1280, 2560, 5120, 10240\}$ slots, with m=0), 1, 2, 3 for SCS 15, 30, 60, and 120 kHz, respectively. PRS Resource Set Slot Offset defines the slot offset with respect to System Frame Number (SFN)/Slot Number zero of the TRP (i.e., defines the slot where the first PRS Resource of the PRS Resource Set occurs). PRS Resource Slot Offset defines the starting slot of the PRS Resource with respect to the corresponding PRS Resource Set Slot Offset. PRS Resource Repetition Factor defines how many times each PRS Resource is repeated for a single instance of the PRS Resource Set, and PRS Resource Time Gap defines the offset in number of slots between two repeated instances of a PRS Resource within a single instance of the PRS Resource Set, as described above.

A PRS Resource may be muted. Muting may be signaled using a bit-map to indicate which configured PRS Resources are transmitted with zero-power (i.e., muted). In one option, the muting bit map may have a length of {2, 4, 6, 8, 16, 32} bits and muting is applied on each transmission instance of a PRS Resource Set. Each bit in the bit map may correspond to a configurable number of consecutive instances of a PRS Resource Set. All PRS Resources within a PRS Resource Set instance may be muted (transmitted with zero power) if the corresponding bit in the bit map indicates a '0'. The number of consecutive instances may be controlled by the parameter PRS Muting-Bit Repetition Factor, which may have the values {1, 2, 4, 8}. In another option, muting may be applied on each repetition of each of the PRS Resources. Each bit in the bit map may correspond to a single repetition of the PRS Resource within an instance of a PRS Resource Set. The length of the bit map may then be equal to the PRS Resource Repetition Factor.

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set may have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
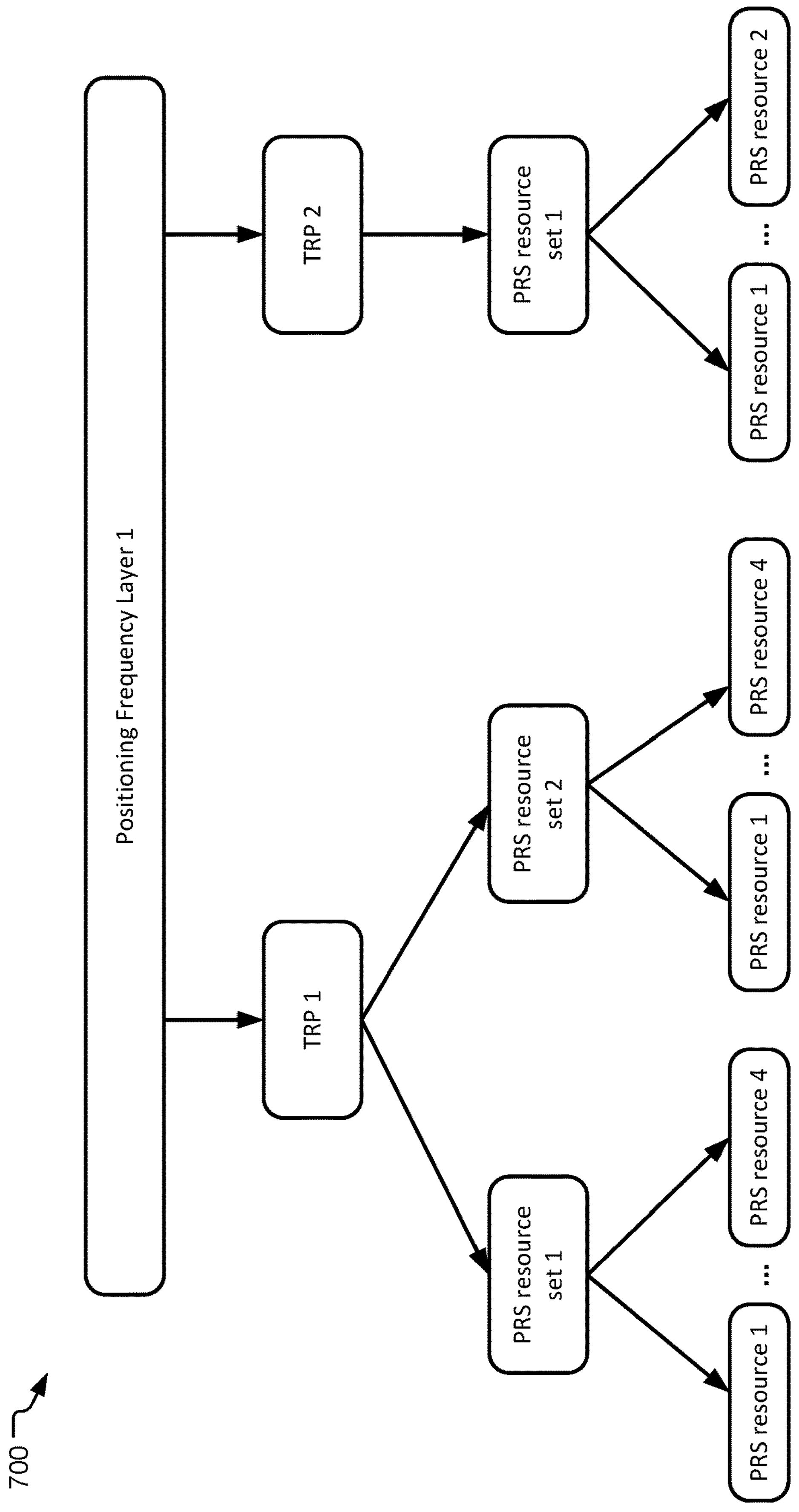
FIG. 7 is a diagram of an example positioning frequency layer.

Referring to FIG. 7, a conceptual diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same PRS Point-A, the same value of PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

If the PRS is transmitted by a TRP, the PRS may be referred to as DL-PRS: if the PRS is transmitted by a UE, the PRS may be referred to as UL-PRS. The UL-PRS may be based on SRS with enhancements for positioning purposes. The UL-PRS may also be referred to as "SRS for positioning". In some respects, the UL-PRS can be seen as the uplink equivalence to the DL-PRS.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHZ, and for the FR2 bands may be 50, 100, 200, 400 MHZ. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 KHz.

Figure 8:
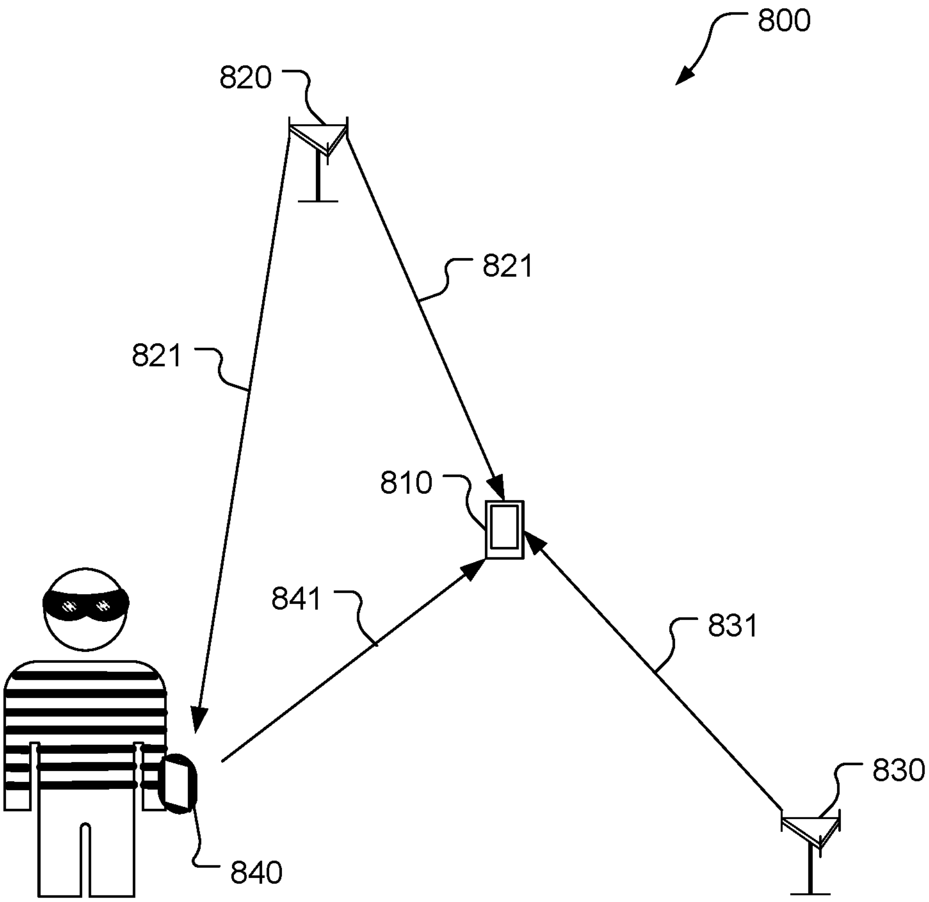
FIG. 8 is a communication environment including a user equipment, base stations, and an attacker.

Referring to FIG. 8, a UE may be susceptible to any of a variety of reference signal attacks that may affect an ability to decode and/or measure a legitimate reference signal, e.g., to measure a positioning reference signal accurately and thus to determine a location of the UE accurately. For example, in an environment 800, a UE 810 may receive legitimate signals 821, 831 from TRPs 820, 830, but may also receive an attack signal 841 from an attacker 840. The attack signal may simulate or copy one of the legitimate signal 821, 831 or may be independent of the legitimate signals 821, 831. For example, in a first type of RS attack, the attacker may receive one or more symbols of the legitimate signal 821, determine transmission parameters (e.g., a scrambling ID (identity)) for the legitimate signal 821, and generate the attack signal 841 using the transmission parameters of the legitimate signal 821. If, for example, the legitimate signal 821 is a PRS, and the attack signal simulates the legitimate signal 821, then the UE 810 may measure the attack signal 841 as if the attack signal originated from the location of the TRP 820, which may negatively impact the accuracy of a location of the UE 810 determined using the measurement of the attack signal 841.

Prior preamble sequences were used to improve autocorrelation properties to enable a receiver to accurately detect and decode a signal. For example, Ipatov sequences have been used because they have perfect periodic autocorrelation properties which enable simpler channel estimation and more accurate position estimation. PRS transmissions, such as depicted in FIG. 6, may use a Gold sequence which fulfills the requirements of a well-focused autocorrelation. Such known sequences, however, are susceptible to such attacks as depicted in FIG. 8. AES encryption may be used to randomize the preamble sequences (e.g., IEEE 802.15.4z) and/or to replace a Gold sequence, but these approaches may decrease the accuracy of position estimates due to the creation of sidelobes for some of the secure sequences. As provided herein, this performance degradation may be alleviated by selectively discarding the AES generated sequences which cause the larger (e.g., worst) sidelobes.

Figure 9:
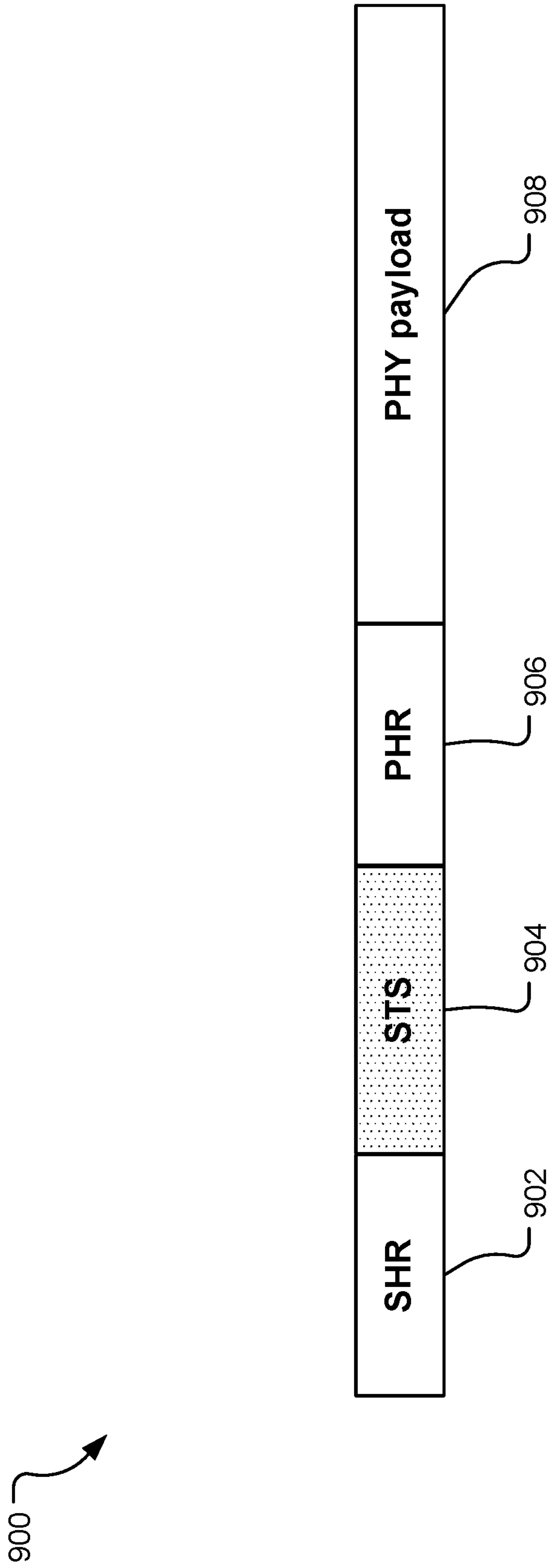
FIG. 9 is an example physical protocol data unit (PPDU) structure incorporating a secure sequence for ranging.

Referring to FIG. 9, an example physical protocol data unit (PPDU) structure 900 incorporating a secure sequence for ranging is shown. The PPDU structure 900 is an example, and not a limitation, as other data structures may include a secure sequence for ranging. In an effort to reduce the chances of an external attack, such as depicted in FIG. 8, secure ranging protocols may encrypt the physical layer (PHY) timestamp sequence using the AES-128 encryption algorithm. The PPDU structure 900 may include a synchronization header (SHR) 902, a physical layer header (PHR) 906, and a PHY payload 908. Since, timestamp detection is the basis for accurate range estimation and localization precision, the PPDU 900 may incorporate a scrambled timestamp sequence (STS) 904 to enable secure ranging. The STS 904 may be encrypted using the AES-128 algorithm and the ToA estimation may be based on decoding the STS 904. A range measurement may be validated if the received STS 904 can be cross correlated with a locally generated reference. The receiving station is configured to locally generate a secure sequence based on the same key information used by the transmitting station to generate the secure sequence. For example, the STS key and V values utilized in the AES algorithm may be used by both stations to generate the original secure sequence and the reference.

Figure 10:
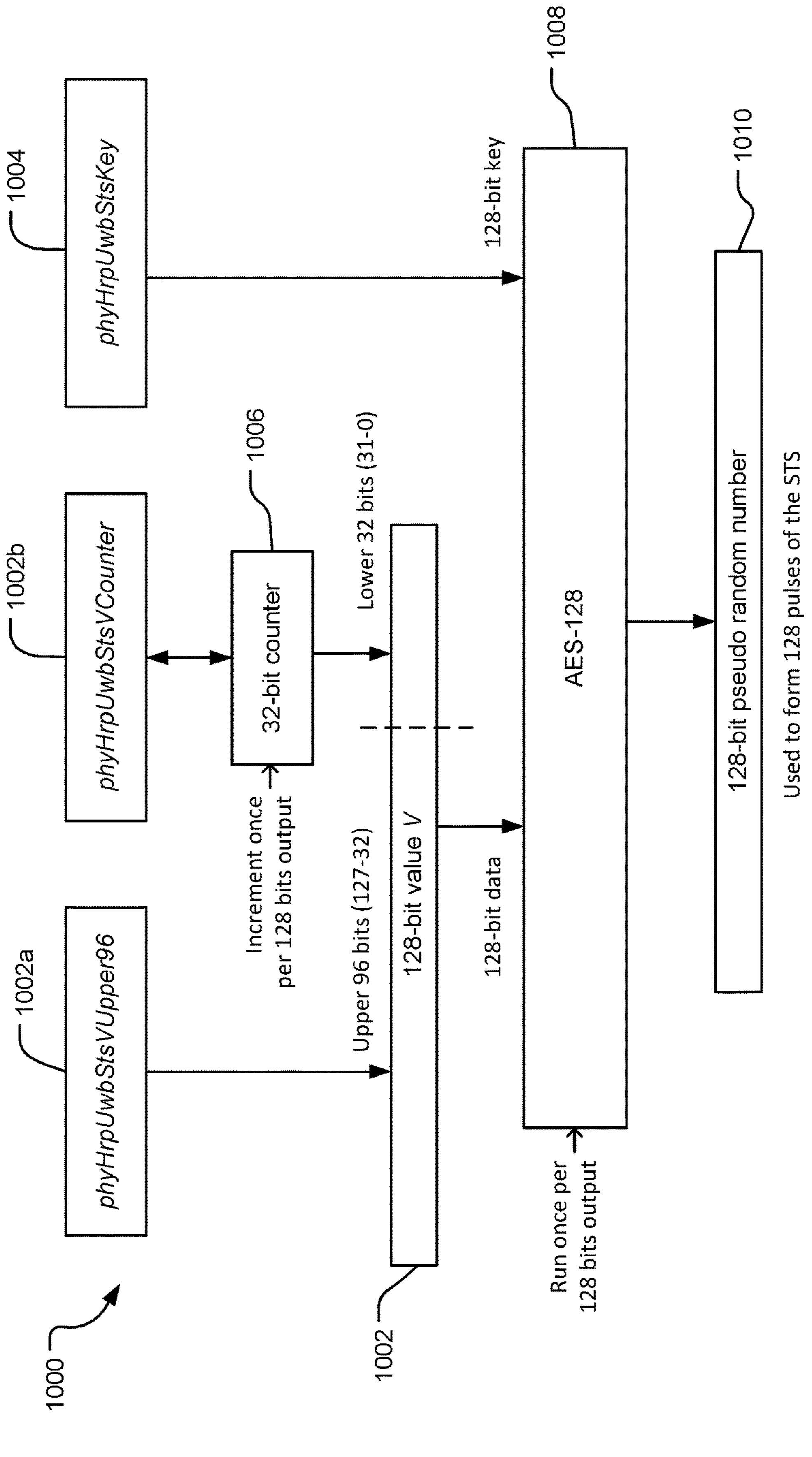
FIG. 10 Prior Art
FIG. 10 is a block diagram of a process for generating a pseudo random number based on the Advanced Encryption Standard (AES).

Referring to FIG. 10, a block diagram of a process 1000 for generating a pseudo random number based on the AES standard is shown. The resulting pseudo random number may be used as a STS for ranging as described in the IEEE 802.15.4z standard. The process 1000 utilizes a block size of 128 bits, but other sizes may also be used (e.g., 192, 256 bits). An STS consists of a sequence of pseudo randomized pulses generated by a Deterministic Random Bit Generator (DRBG) based on AES-128 in counter mode, such as the process 1000. Each time the DRBG is run, it produces a 128-bit pseudo random number used for the STS. The process 1000 provides a 128-bit value V 1002 and a 128-bit key 1004 to the AES-128 algorithm 1008. The value V 1002 may include an upper 96 bits 1002*a* and a 32 bit counter 1002*b* which may be incremented once per 128-bits of output. The output of the AES-128 algorithm 1008 is a 128-bit pseudo random number 1010 which is used to form the STS. In operation, a transmitting station and a receiving station may receive V and key values (including the counter configuration) via a secure means and each station may generate the same 128-bit pseudo random number 1010 based on those inputs. The receiving station may correlate the locally generated STS with the STS received from the transmitting station.

Figure 11:
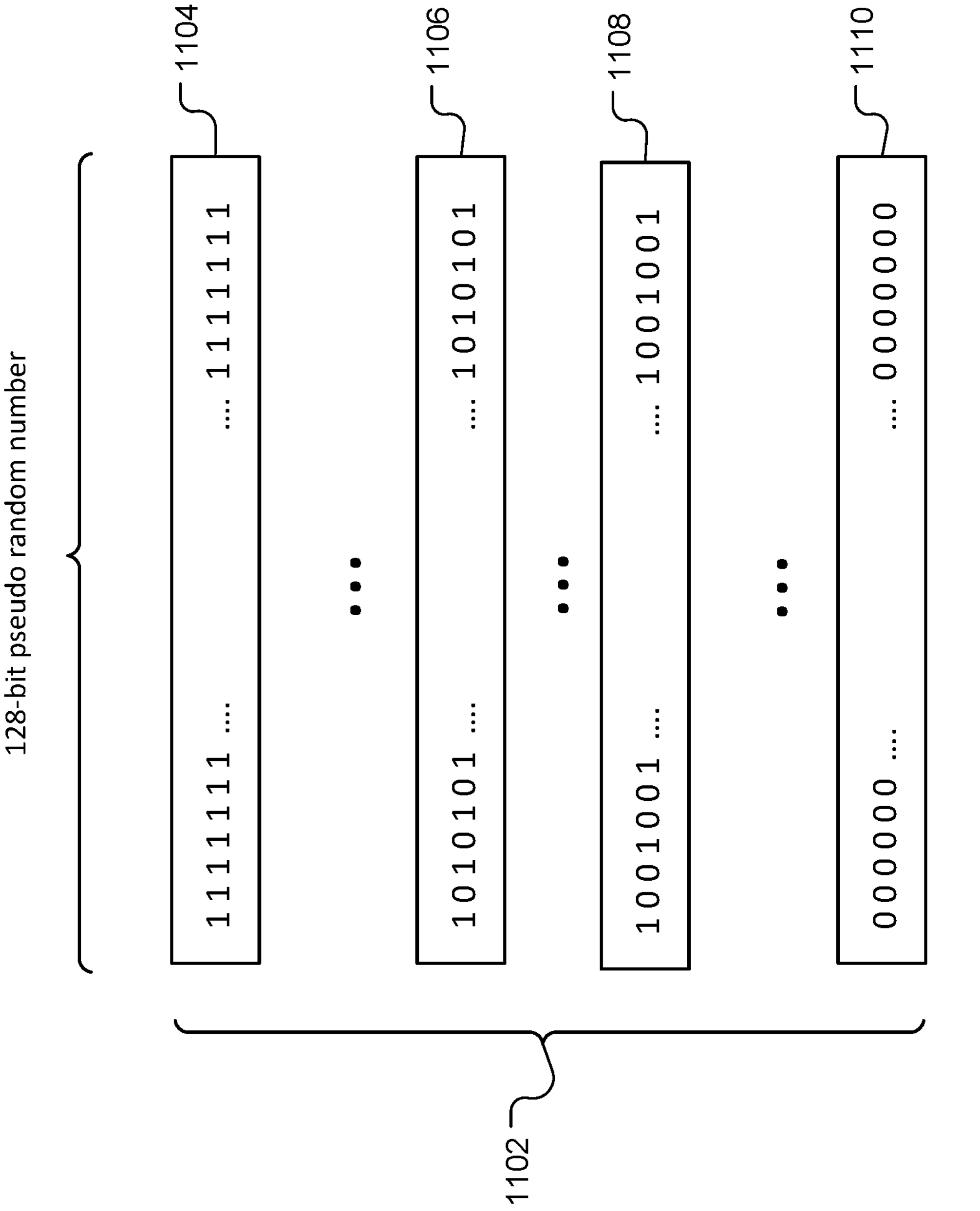
FIG. 11 includes examples of pseudo random numbers with poor autocorrelation properties.

Referring to FIG. 11, examples of 128-bit pseudo random numbers with poor correlation properties are shown. Each time the 32-bit counter 1006 increments, the value of V 1002 will change and the 128-bit pseudo random number 1010 will also change. Since all combinations of the 128-bits are possible, it is likely that some combinations will include repeating sequences which will decrease the ability of the receiver to obtain a channel estimate. For example, the possible combinations 1102 of the 128-bit pseudo random numbers generated by the process 1000 may include a first sequence 1104 comprising all 1's, or a second sequence 1110 of all 0's. Such sequences cannot be correlated since any windowing of the sequence would provide the same results. Other sequences may also provide poor correlation, such as a third sequence 1106 with a repeating pattern of 1 and 0, and a fourth sequence 1108 with a repeating pattern of 1, 0, 0. These sequences are examples, and not limitations, as other sequences may also have poor correlation properties.

Figure 12:
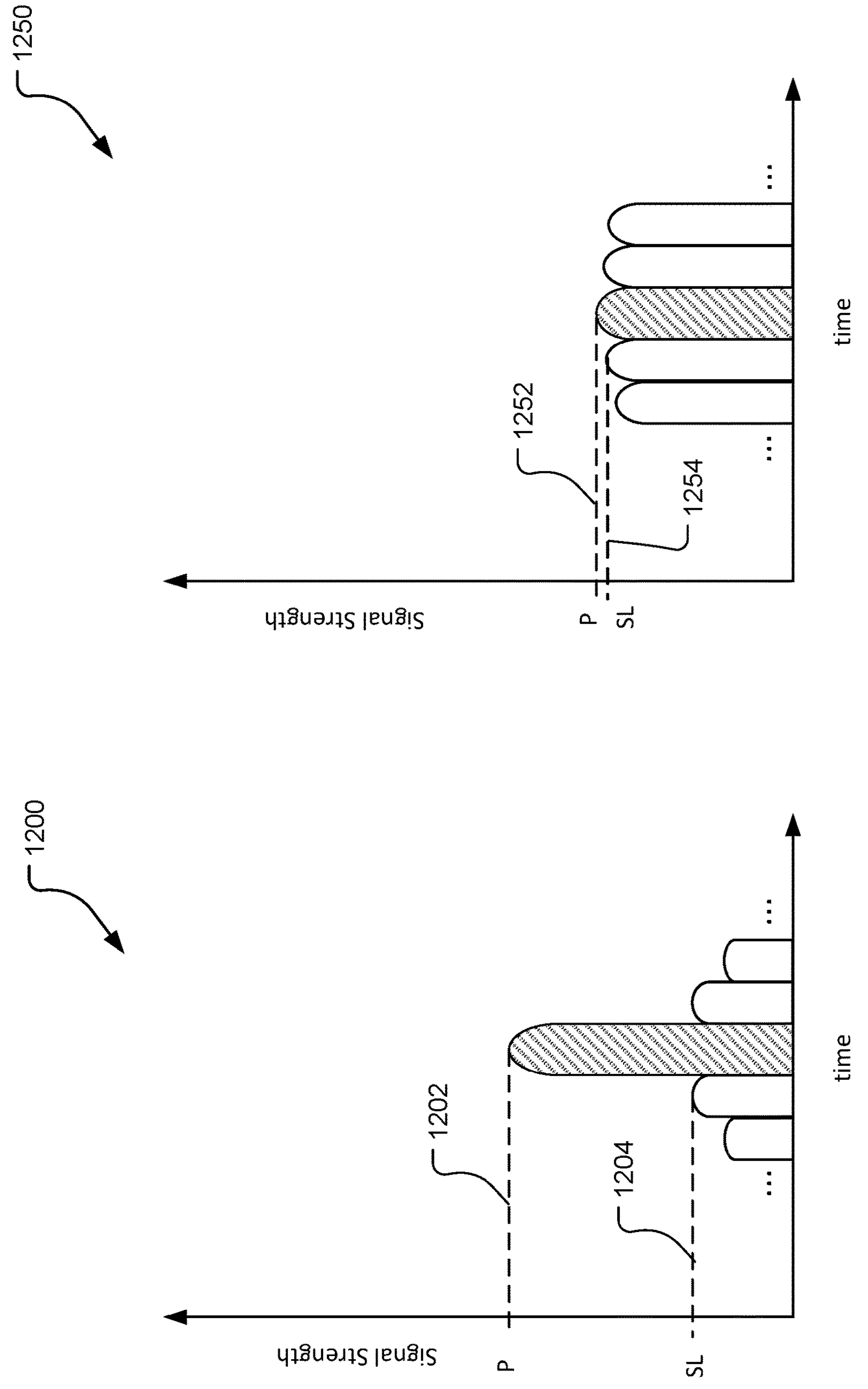
FIG. 12 are example illustrations of sidelobes associated with different pseudo random sequences.

Referring to FIG. 12, example illustrations of sidelobes associated with different pseudo random sequences are shown. A first illustration 1200 depicts a relatively strong peak signal 1202 and a relatively low sidelobe signal 1204. The first illustration 1200 is associated with a sequence which has relatively high correlation properties and will result in an accurate ToA measurement value. In comparison, a second illustration 1250 is associated with a sequence with low correlation properties (e.g., the third and fourth sequences 1106, 1108). In this example, the difference between the peak signal 1252 and the sidelobe signal 1254 is small. The presence of the sidelobes reduces the ability of the receiver to determine the ToA of the encrypted signal because the difference between the peak and sidelobe signals may be within the channel noise. The accuracy of a position estimate based on a sequence associated with the second illustration 1250 will be reduced as compared to a sequence associated with the first illustration 1200 because of the increased error associated with the ToA measurement. The techniques provided herein may alleviate the degradation of positioning accuracy associated with secure sequences by measuring a quality metric for each secure sequence (e.g. autocorrelation), and rejecting the secure sequences which fail to meet an established threshold.

Figure 13:
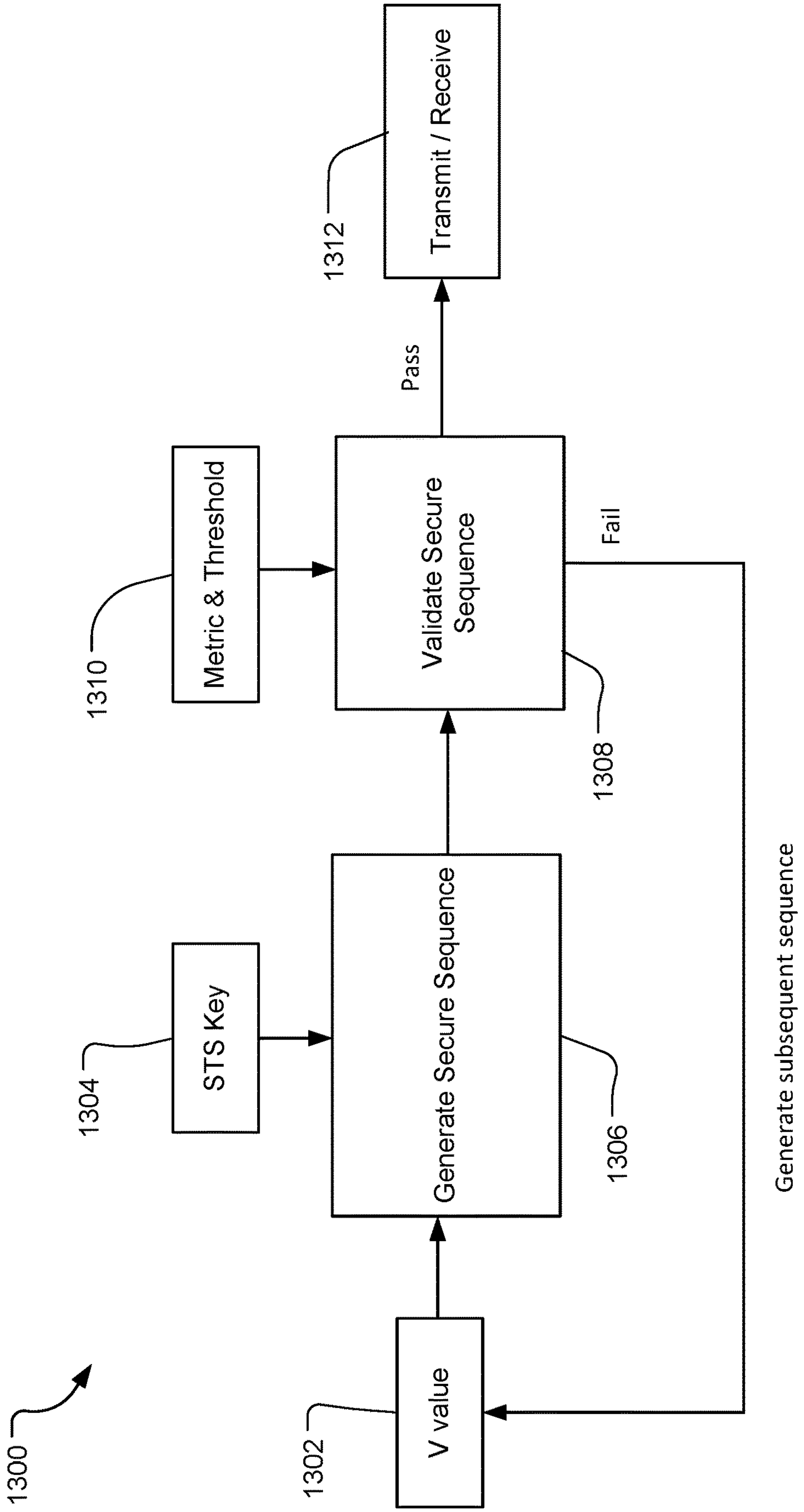
FIG. 13 is an example process for validating a secure sequence.

Referring to FIG. 13, with further reference to FIG. 10, an example process 1300 for validating a secure sequence is shown. The process 1300 may be performed by both a transmitting station and a receiving station to determine which secure sequences to transmit or receive. The transmitting and receiving stations may be configured with cryptographic parameters such as a V value 1302 and a STS key 1304 described in FIG. 10. Other configuration information such as windowing functions may be utilized by both stations. The cryptographic parameters may be used at stage 1306 to generate a secure sequence. In an example, the AES algorithm 1008 may be used to generate 128-bit pseudo random numbers as secure sequences.

At stage 1308, the process 1300 includes validating a secure sequence generated at stage 1306. The validation may be based on a metric and corresponding threshold information 1310, which will be the same for both the transmitting and receiving stations. In an example, the metric may be based on an autocorrelation result, and the threshold may be a percentile score (e.g., 90%, 95%, 98%, etc.). The threshold value may be a fixed value and may be defined in a specification. The threshold value may be configured by a network resource (e.g., the LMF 120), or by a mutual agreement between the transmitting and receiving stations. The autocorrelation may be defined as:

$$R[k] = \sum_{k=-(N-1)}^{N-1} A[n]A[n-k] \tag{1}$$

where,

A[n] denotes the sequence (n=1, 2, . . . . N); and

R[k] denotes the autocorrelation (k=−(N−1), . . . (N−1)).

Other metrics and threshold values may also be used to validate a secure sequence. For example, the peak average power ratio (PAPR) and/or a peak-to-sidelobe ratio may be used. Referring to FIG. 12, the peak-to-sidelobe ratio may be based on the sidelobe peak (SL) divided by the global peak (P) and sequences with ratios above a threshold value (e.g., 0.1, 0.15, 0.2, etc.) are rejected. The threshold values may be adaptively modified by the transmitting and receiving stations based on past channel measurements. For example, if the transmitter-receiver pair encounter severe multipath over several measurements/instances, the threshold value may be lowered to examine a larger number of candidate paths.

The transmitting and receiving stations may perform the process 1300 independently based on the same cryptographic parameters, validation metric(s) and threshold values. If a secure sequence is determined valid at stage 1308, it will be transmitted by the transmitting station and used for decoding by the receiving station at stage 1312. Alternatively, if a secure sequence is not validated at stage 1308, it will be ignored/discarded and will not be used for transmission. Both the transmitting and receiving stations are configured to generate the next secure sequence and perform a validation check on that secure sequence. The next secure sequence may be based on changing a counter value (e.g., the 32-bit counter 1006), or the upper 96 bits of the V value, or both, and generating a new secure sequence.

Figure 14A:
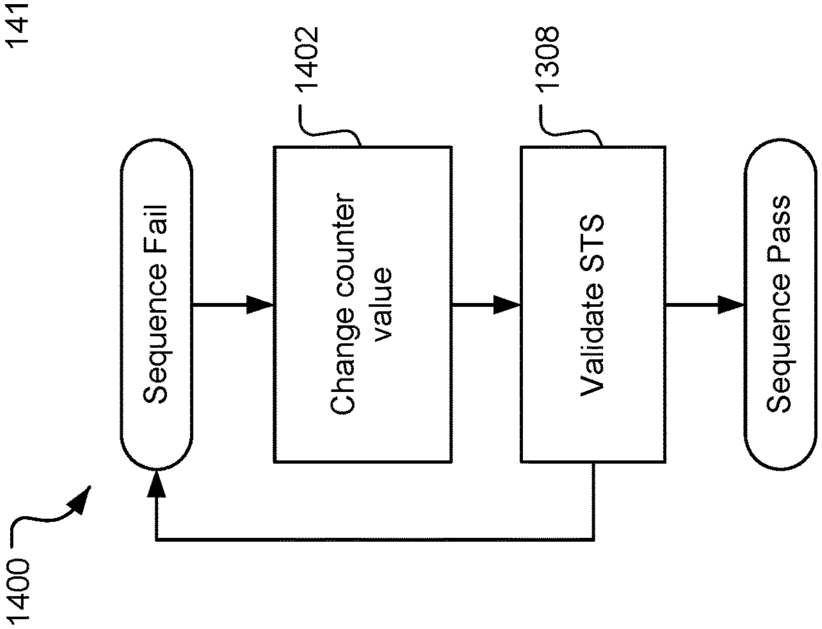
FIGS. 14A, 14B and 14C are example processes flows for generating a next pseudo random sequence.
Figure 14B:
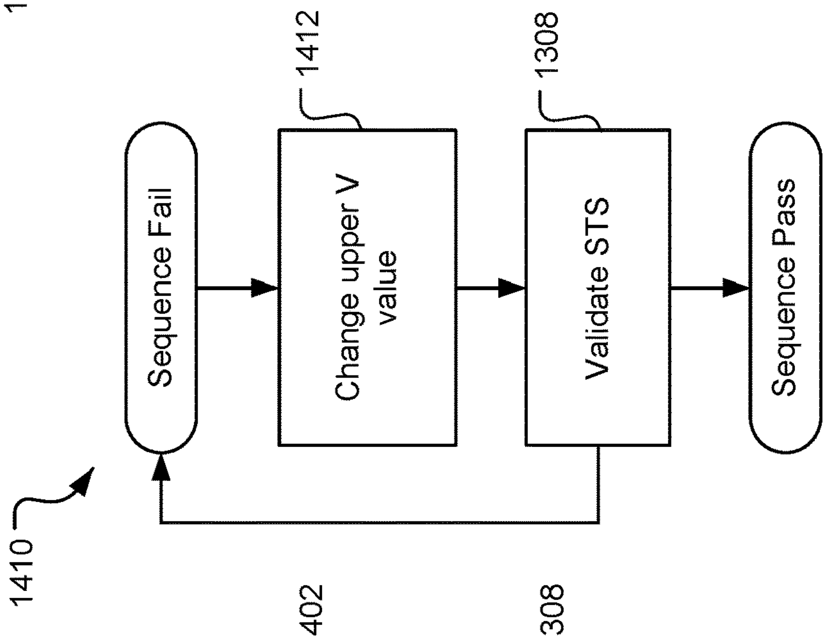
Figure 14C:
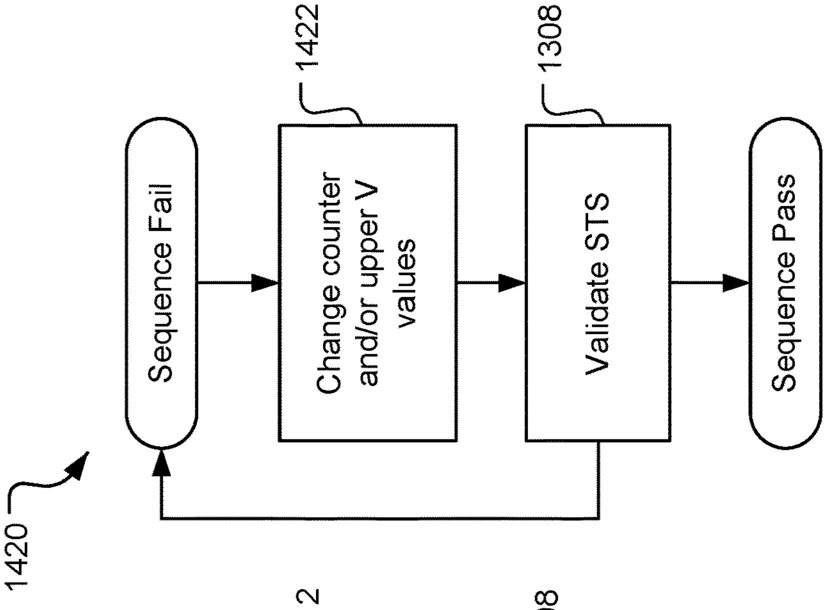

Referring to FIGS. 14A, 14B and 14C, with further reference to FIGS. 10 and 13, example process flows for generating a next pseudo random sequence are shown. In a first process 1400, after failing to validate at stage 1308 of the process 1300, the 32-bit counter 1006 may be configured to increment or decrement to a different value at stage 1402. In an example, the change may be to increment to the next value. Other changes to the counter value such as incrementing or decrementing by two, three, or more values may also be used. The new counter value will create a new V value and a new 128-bit pseudo random number 1010 which will be evaluated at stage 1308. In a second process 1410, upon failing to validate at stage 1308, the upper V 96-bits 1002*a* may be changed at stage 1412. In an example, a plurality of preconfigured upper V 96-bits 1002*a* may be stored in the transmitting and receiving stations. One of the preconfigured upper V 96-bits 1002*a* (i.e., based on an index value) may be retrieved and used in the process 1000 as a new V value. The resulting 128-bit pseudo random number may then be validated at stage 1308. In a third process 1420, a combination of changes to the upper V value and/or counter value may be implemented at stage 1422 to change the V value. The procedure for changing the V value will be known to both the transmitting and receiving station such that both stations will be configured to generate the same secure sequences.

Figure 15A:
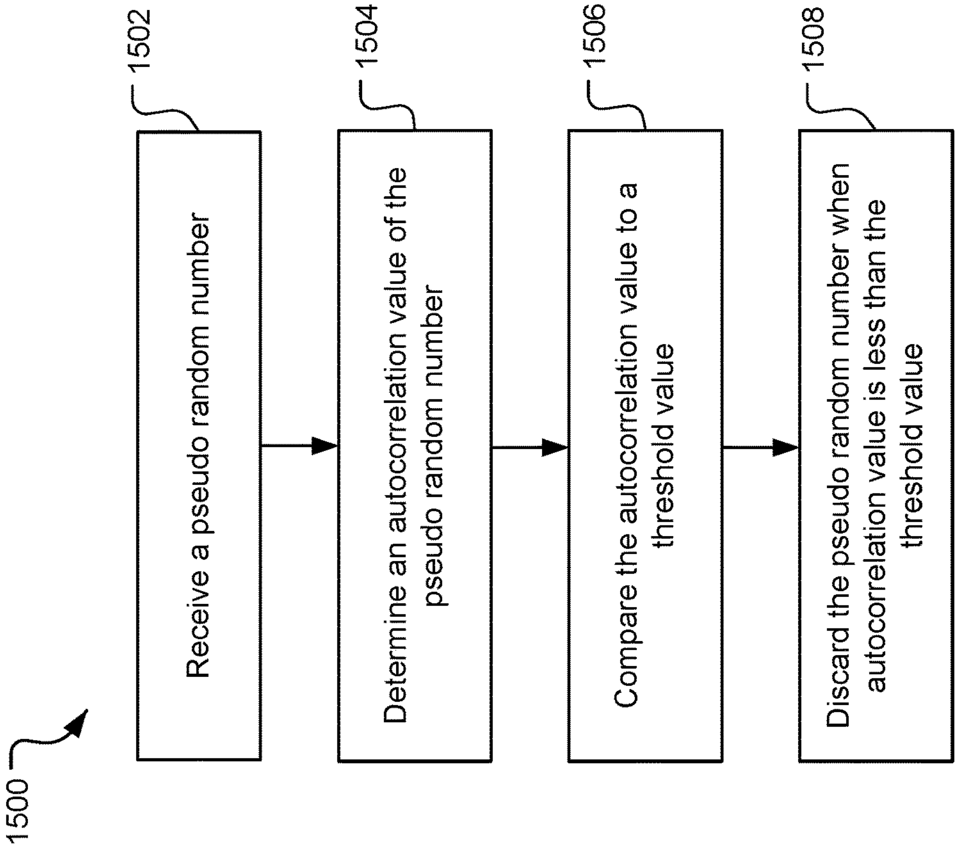
FIGS. 15A and 15B are example process flows for methods of discarding a pseudo random sequence.

Referring to FIG. 15A, with further reference to FIG. 13, a first method 1500 for discarding a pseudo random sequence includes the stages shown. The method 1500 is, however, an example only and not limiting. The method 1500 may be altered, e.g., by having stages added, removed, rearranged, combined, performed concurrently, and/or having single stages split into multiple stages. The method 1500 may be performed by a transmitting station, such as the TRP 300, and/or a receiving station, such as the UE 200. Other devices configured to transmit or receive radio signals may also be configured to perform the method 1500.

At stage 1502, the method includes receiving a pseudo random number. One or more processors in a transmitting or receiving device may be means for receiving the pseudo random number. The pseudo random number may be based on an output from the process 1000 in FIG. 10 (e.g., the 128-bit pseudo random number 1010), or on other cryptographic processes configured to generate pseudo random sequences.

At stage 1504, the method includes determining an autocorrelation value of the pseudo random number. One or more processors in a transmitting or receiving device may be means for determining the autocorrelation value. Autocorrelation is an example of a metric for determining the strength of a secure sequence for communications and positioning applications. In an example, the autocorrelation value may be computed using equation (1) above. Other correlation techniques may also be used.

At stage 1506, the method includes comparing the autocorrelation value to a threshold value. One or more processors in a transmitting or receiving device may be means for comparing the autocorrelation value to a threshold value. The threshold value is an example of a condition to determine whether the pseudo random number will be suitable as a secure sequence for communication or positioning applications. For example, the threshold value may be used to determine whether the secure sequence will have excessive sidelobes which may impact the channel estimate and the ToA determination. In an example, the threshold value for an autocorrelation may be in a range of 90-99%. Other threshold values may also be used.

At stage 1508, the method includes discarding the pseudo random number when the autocorrelation value is less than the threshold value. One or more processors in a transmitting or receiving device may be means for discarding the pseudo random number. If the autocorrelation value does not meet the established threshold, the pseudo random number will not be used for the intended communication or positioning application. Another pseudo random number may be received and the method 1500 may repeat until a successful autocorrelation is realized.

Figure 15B:
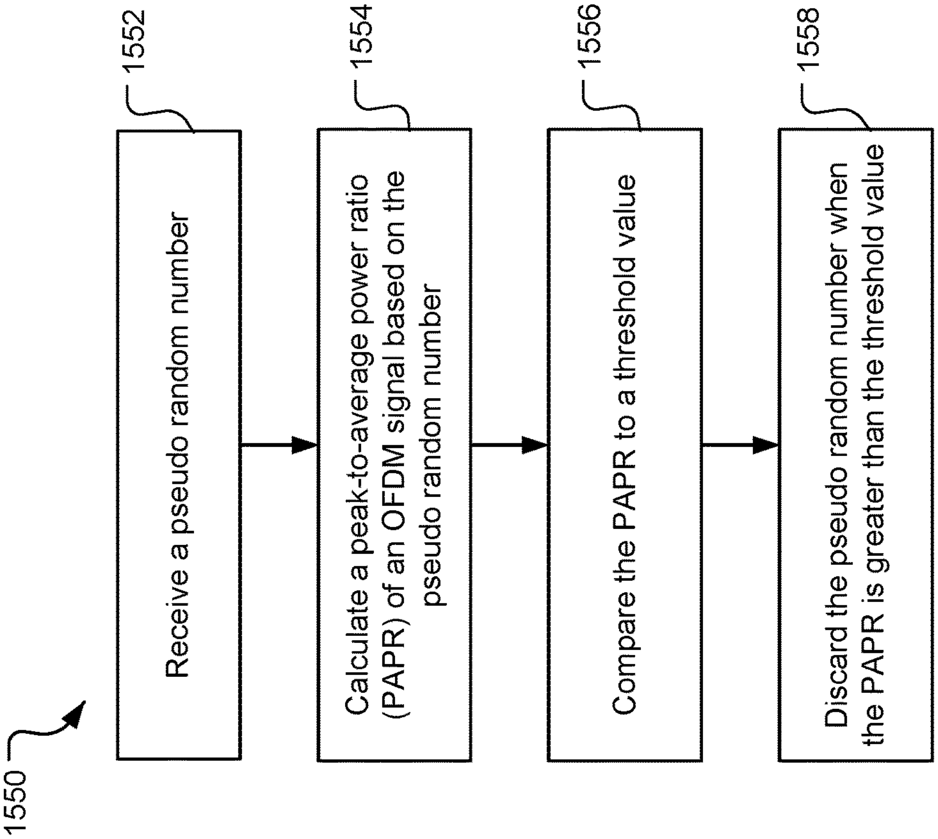

Referring to FIG. 15B, with further reference to FIG. 13, a second method 1550 for discarding a pseudo random sequence includes the stages shown. The method 1550 is, however, an example only and not limiting. The method 1550 may be altered, e.g., by having stages added, removed, rearranged, combined, performed concurrently, and/or having single stages split into multiple stages. The method 1550 may be performed by a transmitting station, such as the TRP 300, and/or a receiving station, such as the UE 200. Other devices configured to transmit or receive radio signals may also be configured to perform the method 1550.

At stage 1552, the method includes receiving a pseudo random number. One or more processors in a transmitting or receiving device may be means for receiving the pseudo random number. The pseudo random number may be based on an output from the process 1000 in FIG. 10 (e.g., the 128-bit pseudo random number 1010), or on other cryptographic processes configured to generate pseudo random sequences.

At stage 1554, the method includes calculating a peak-to-average power ratio (PAPR) of an OFDM signal based on the pseudo random number. One or more processors in a transmitting or receiving device may be means for calculating the PAPR. The PAPR is an example of a metric for determining the strength of a secure sequence for communications and positioning applications. In an example, the PAPR may be computed as the maximum power of a sample in an OFDM symbol divided by the average power of that OFDM symbol.

At stage 1556, the method includes comparing the PAPR to a threshold value. One or more processors in a transmitting or receiving device may be means for comparing the PAPR to a threshold value. The threshold value is an example of a condition to determine whether the pseudo random number will be suitable as a secure sequence for communication or positioning applications. For example, the threshold value may be used to determine whether the secure sequence will have excessive sidelobes which may impact the channel estimate and the ToA determination. In an example, the threshold value for the PARP may be in a range of 0 to 15 dB. Other threshold values may also be used.

At stage 1558, the method includes discarding the pseudo random number when the PAPR value is greater than the threshold value. One or more processors in a transmitting or receiving device may be means for discarding the pseudo random number. If the PAPR exceeds the established threshold, the pseudo random number will not be used for the intended communication or positioning application. Another pseudo random number may be received and the method 1550 may repeat.

In an example, both the methods 1500 and 1550 may be performed to validate or discard a pseudo random number. That is, the pseudo random number may be discarded if it fails to meet both the autocorrelation threshold and the PAPR threshold. Other metrics and threshold, and combinations of metrics and thresholds, may also be used.

Figure 16:
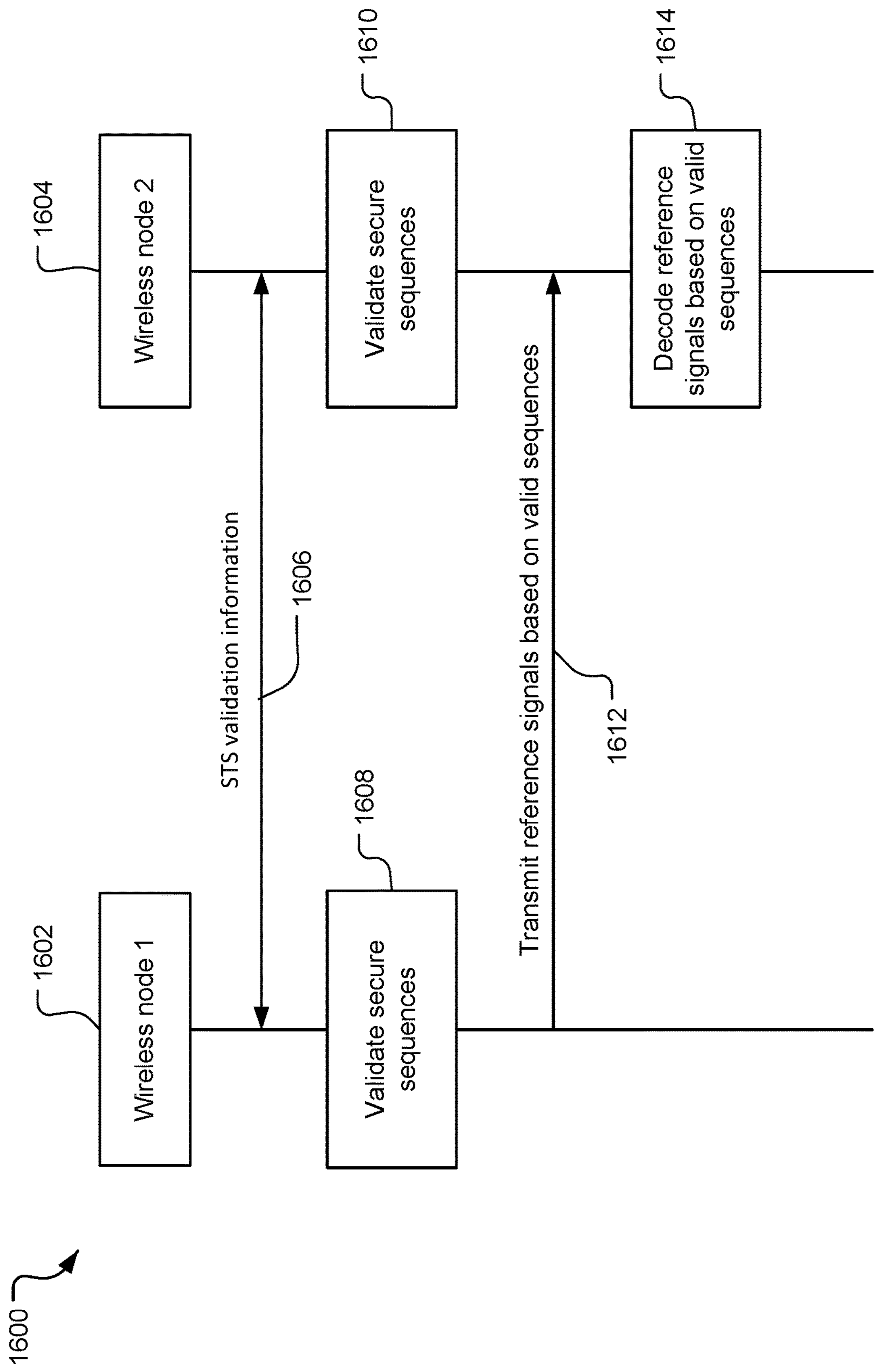
FIG. 16 is a first example message flow for performing a reference signal validation process.

Referring to FIG. 16, a first example message flow 1600 for performing a reference signal validation process is shown. The message flow 1600 includes a first wireless node 1602 and a second wireless node 1604. The wireless nodes 1602, 1604 may be devices configured to send and receive radio frequency signals. In an example, the wireless nodes 1602, 1604 may be elements of the communication system 100 (e.g., a UE, a gNB, ng-eNB) and configured to communicate via cellular protocols (e.g., LTE, 5G NR, etc.). In an example, the wireless nodes 1602, 1604 may both be UEs configured to communicate via one or more sidelink channels. The wireless nodes 1602, 1604 may be other devices configured for other communications technologies such as WiFi, Bluetooth, Zigbee, UWB, etc. In an example, the wireless nodes 1602, 1604 are configured to exchange one or more STS validation information messages 1606 to establish a mutual criteria for validating or rejecting a secure sequence. The STS validation information may include one or more metrics and corresponding threshold values to be used for validating a secure sequence. For example, the metrics may include autocorrelation, PAPR, and peak-to-sidelobe measurements as previously described. The STS validation information may also include filtering/windowing, and/or common modeling and other parameters associated with the metrics to ensure both the wireless nodes 1602, 1604 are capable of performing the same validation process. In an example, the STS validation information messages 1606 may also include cryptographic parameters such as STS key and plain text ('V') values used for generating a secure sequence. In an example, a receiving station may request a transmitting station to utilize the STS validation procedure and the corresponding STS validation information. For example, if the second wireless node 1604 suspected it was being spoofed via malicious reference signals (e.g., FIG. 8), it may request the first wireless node 1602 to utilize the validation procedures described herein.

The wireless nodes 1602, 1604 are configured to each perform a validation process, such as described in FIG. 13, based on the STS validation information. For example, the first wireless node 1602 will validate the secure sequences at stage 1608, and the second wireless node 1604 will validate the secure sequences at stage 1610. Both wireless nodes 1602, 1604 will determine which secure sequences will be discarded. In an example, the first wireless node 1602 is configured as a transmitter and will transmit one or more reference signals 1612 based on the validated sequences. For example, the reference signals 1612 may include the STS 904 described in FIG. 9. In a 5G NR network, the reference signal 1612 may be PRS signals to enable positioning of the second wireless node 1604. Other reference signals may also include a validated secure sequence. The second wireless node 1604 may be configured as a receiving station and at stage 1614 may utilize the secure sequences that were validated at stage 1610 to decode the reference signals 1612.

Figure 17:
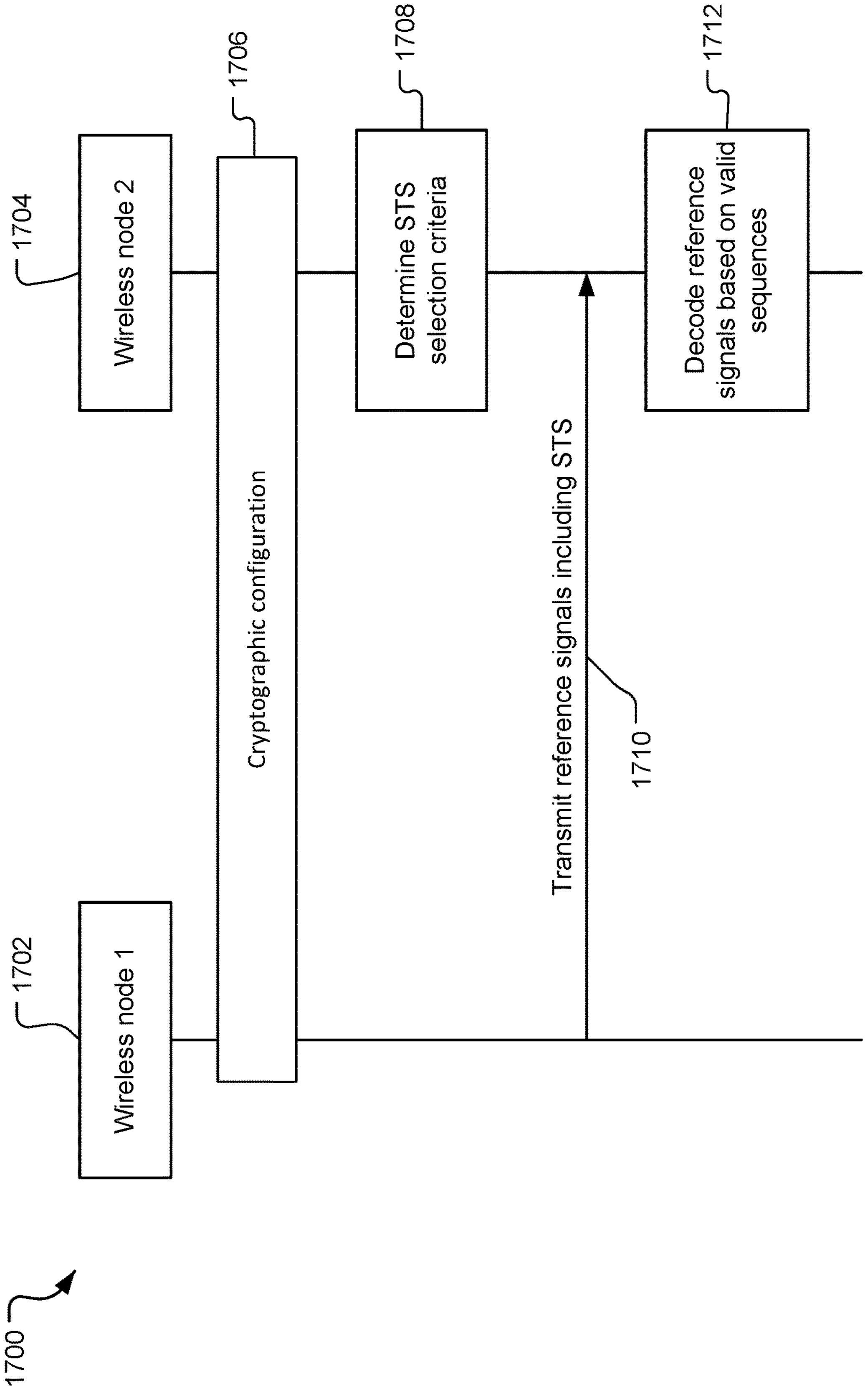
FIG. 17 is a second example message flow for performing a reference signal validation process.

Referring to FIG. 17, a second example message flow 1700 for performing a reference signal validation process is shown. The message flow 1700 includes a first wireless node 1702 and a second wireless node 1704. The wireless nodes 1702, 1704 may be devices configured to send and receive radio frequency signals. In an example, the wireless nodes 1702, 1704 may be elements of the communication system 100 (e.g., a UE, a gNB, ng-eNB) and configured to communicate via cellular protocols (e.g., LTE, 5G NR, etc.). In an example, the wireless nodes 1702, 1704 may both be UEs configured to communicate via one or more sidelink channels. The wireless nodes 1702, 1704 may be other devices configured for other communications technologies such as WiFi, Bluetooth, Zigbee, UWB, etc. In the message flow 1700, the first wireless node 1702 is configured to transmit a reference signal including an STS and the second wireless node 1704 is configured to receive the reference signal and decode based on the STS.

At stage 1706, the wireless nodes 1702, 1704 are configured to establish a cryptographic configuration for generating secure sequences. For example, referring to the AES algorithm in FIG. 10, the wireless nodes 1702, 1704 may share a STS key value 1004 and V value parameters including the upper 96-bits 1002*a* and V counter information 1002*b*. Other cryptographic algorithms and associated parameters may also be used by the wireless nodes 1702, 1704 to generate and receive secure sequences.

At stage 1708, the second wireless node 1704 is configured to determine which STS generated based on the cryptographic configuration will be suitable for the desired communication and/or positioning applications. For example, the second wireless node 1704 may generate the secure sequences based on the cryptographic configuration, and then perform the validation process described in FIG. 13 on the resulting pseudo random numbers. The sequences which fail validation (e.g., based on poor autocorrelation, high PAPR, peak-to-sidelobe ratio, etc.) are discarded and the second wireless node 1704 will not attempt to decode reference signals with those sequences. For example, the first wireless node 1702 may transmit reference signals 1710 including secure sequences. The first wireless node 1702 does not attempt to validate the secure sequence and will transmit each secure sequence regardless of the autocorrelation properties. The reference signals 1710 may be based on PRS resources, or signals based on other technologies such as WiFi, Bluetooth, etc. In an example, the wireless nodes 1702, 1704 may be configured to utilize impulse-radio ultrawideband (IR-UWB). At stage 1712, the second wireless node 1704 is configured to decode the reference signals 1710 which are based on valid secure sequences and will ignore the reference signals based on the secure sequences that are discarded at stage 1708. For example, the second wireless node 1704 will not use the reference signals utilizing discarded sequences for position estimation.

Figure 18B:
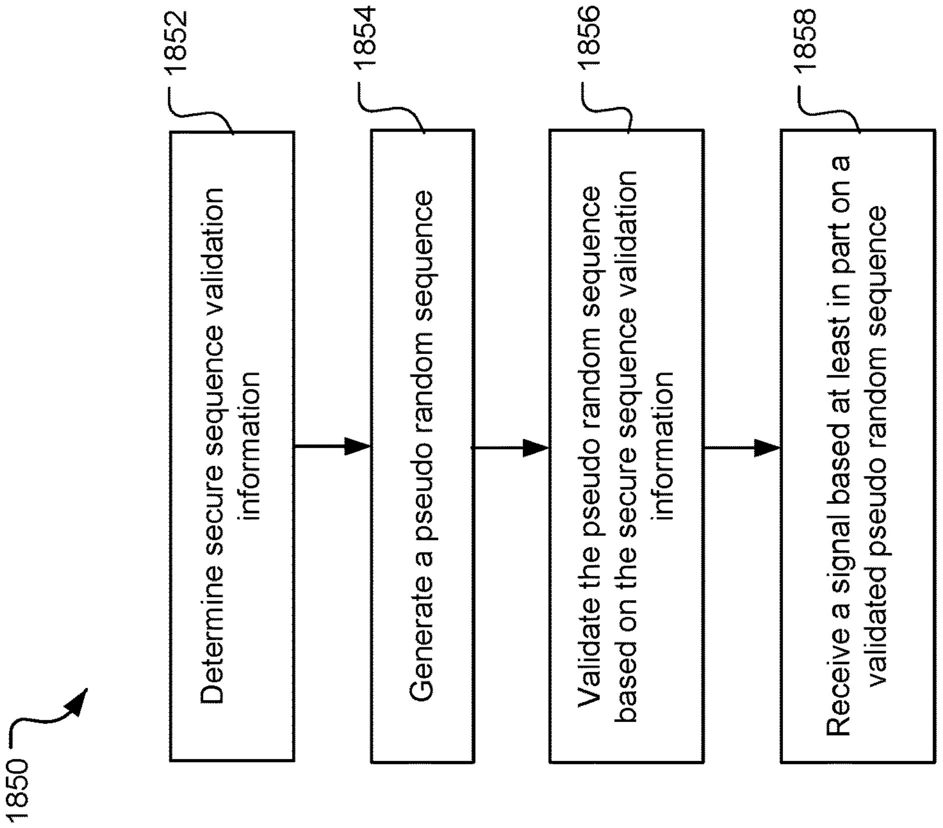
FIGS. 18A and 18B are process flow diagrams for example methods of sending and receiving signals based on a validated pseudo random sequence.
Figure 18A:
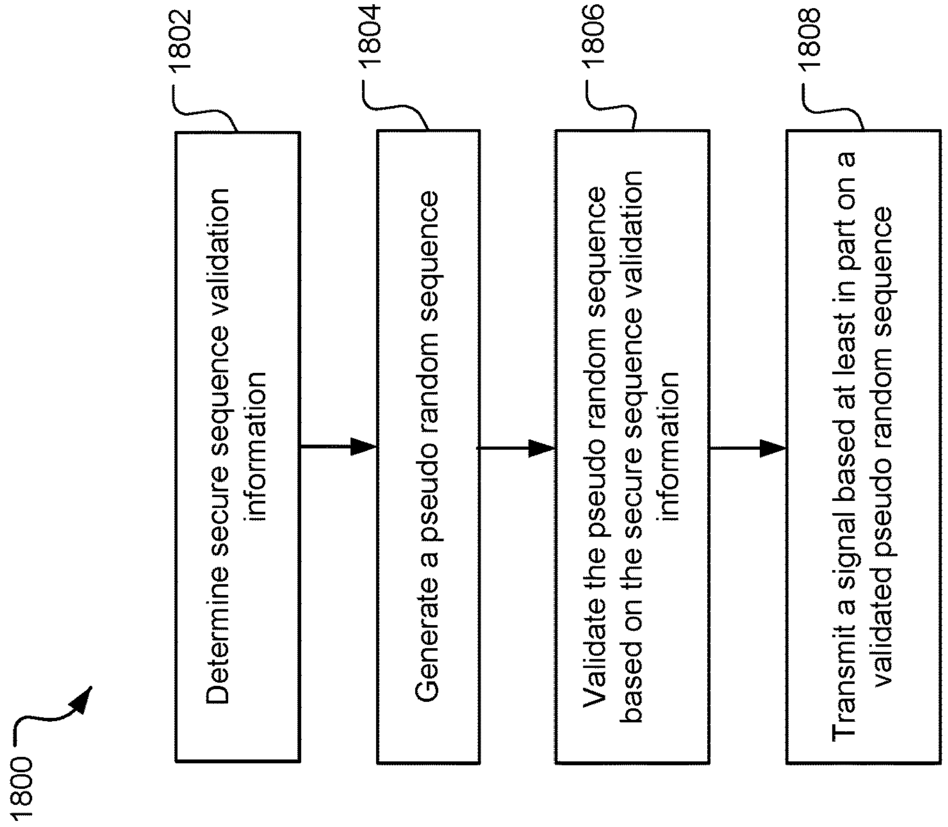

Referring to FIG. 18A, with further reference to FIGS. 1-17, a method 1800 for transmitting a signal based on a validated pseudo random sequence includes the stages shown. The method 1800 is, however, an example only and not limiting. The method 1800 may be altered, e.g., by having stages added, removed, rearranged, combined, performed concurrently, and/or having single stages split into multiple stages.

At stage 1802, the method includes determining secure sequence validation information. A TRP 300, including the processor 310 and the transceiver 315, are means for determining secure sequence validation information. A transmitting station, such as the TRP 300, or other device configured to transmit RF signals, may be configured to generate secure sequences such as pseudo random numbers output from the AES algorithm as described herein. Other cryptographic techniques may also be used to generate a secure sequence. The validation process may be based on one or more metrics and corresponding threshold values which the transmitting and receiving stations may use to validate the correlation properties of the secure sequences. In an example, the transmitting and receiving stations may exchange messages to determine the validation information. The validation information may also be determined by a network resource (e.g., the LMF 120), or may be based on other network procedures. In an example, The secure sequence validation information may also include filtering/windowing, and/or common modeling and other parameters associated with the metrics to ensure both the transmitting and receiving stations are capable of performing the same validation process.

At stage 1804, the method includes generating a pseudo random sequence. The processor 310 is a means for generating the pseudo random sequence. In an example, the pseudo random sequence is the pseudo random number 1010 generated via the AES algorithm 1008. The transmitting and receiving stations may utilize the same STS key and V value as an input to the AES algorithm to independently generate the same pseudo random sequence.

At stage 1806, the method includes validating the pseudo random sequence based on the secure sequence validation information. The processor 310 is a means for validating the pseudo random sequence. In an example, the metric and threshold obtained at stage 1802 may be based on the autocorrelation of the pseudo random sequence generated at stage 1804. Other metrics and threshold values, such as the PAPR and the peak-to-sidelobe ratio may be used to validate the pseudo random sequence. In an example, the methods described in FIGS. 15A and 15B may be used to validate or discard the pseudo random sequence.

At stage 1808, the method includes transmitting a signal based at least in part on a validated pseudo random sequence. The processor 310 and the transceiver 315 are means for transmitting the signal. In an example, the validated pseudo random sequence may be applied to a PRS transmitted by a gNB in the communication system 100. Other signals and other wireless technologies, such as WiFi and UWB may utilize STS components based on the validated pseudo sequence.

Referring to FIG. 18B, with further reference to FIGS. 1-17, a method 1850 for receiving a signal based on a validated pseudo random sequence includes the stages shown. The method 1850 is, however, an example only and not limiting. The method 1850 may be altered, e.g., by having stages added, removed, rearranged, combined, performed concurrently, and/or having single stages split into multiple stages.

At stage 1852, the method includes determining secure sequence validation information. A UE 200, including the processors 210 and the transceiver 215, are means for determining secure sequence validation information. A receiving station, such as the UE 200, or other device configured to receive RF signals, may be configured to generate secure sequences such as pseudo random numbers output from the AES algorithm as described herein. Other cryptographic techniques may also be used to generate a secure sequence. The validation process may be based on one or more metrics and corresponding threshold values which the transmitting and receiving stations may use to validate the correlation properties of the secure sequences. In an example, the transmitting and receiving stations may exchange messages to determine the validation information. The validation information may also be determined by a network resource (e.g., the LMF 120), or may be based on other network procedures. In an example, The secure sequence validation information may also include filtering/windowing, and/or common modeling and other parameters associated with the metrics to ensure both the transmitting and receiving stations are capable of performing the same validation process.

At stage 1854, the method includes generating a pseudo random sequence. The processors 210 are a means for generating the pseudo random sequence. In an example, the pseudo random sequence is the pseudo random number 1010 generated via the AES algorithm 1008. The transmitting and receiving stations may utilize the same STS key and V value as an input to the AES algorithm to independently generate the same pseudo random sequence.

At stage 1856, the method includes validating the pseudo random sequence based on the secure sequence validation information. The processors 210 are a means for validating the pseudo random sequence. In an example, the metric and threshold determined at stage 1852 may be based on the autocorrelation of the pseudo random sequence generated at stage 1854. Other metrics and threshold values, such as the PAPR and the peak-to-sidelobe ratio may be used to validate the pseudo random sequence. In an example, the methods described in FIGS. 15A and 15B may be used to validate or discard the pseudo random sequence.

At stage 1858, the method includes receiving a signal based at least in part on a validated pseudo random sequence. The processors 210 and the transceiver 215 are means for receiving the signal. In an example, the validated pseudo random sequence may be applied to a PRS transmitted by a gNB in the communication system 100. The UE 200 may be configured to decode the PRS associated with a sequence that was validated at stage 1856. In an example, the UE and other receiving devices such as IoT devices, key fobs, medical devices, asset tracking devices, may be configured to selectively receive signals via other wireless technologies, such as WiFi and UWB, based on the respective validated pseudo sequences.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms “a,” “an,” and “the” include the plural forms as well, unless the context clearly indicates otherwise. The terms “comprises,” “comprising,” “includes,” and/or “including,” as used herein, specify the presence of stated features, integers, steps, operations, elements, and/or components, but do not preclude the presence or addition of one or more other features, integers, steps, operations, elements, components, and/or groups thereof.

Also, as used herein, “or” as used in a list of items (possibly prefaced by “at least one of” or prefaced by “one or more of”) indicates a disjunctive list such that, for example, a list of “at least one of A, B, or C,” or a list of “one or more of A, B, or C” or a list of “A or B or C” means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of “a processor configured to measure at least one of A or B” or “a processor configured to measure A or measure B” means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for transmitting a signal based on a validated pseudo random sequence, comprising: determining secure sequence validation information; generating a pseudo random sequence: validating the pseudo random sequence based on the secure sequence information; and transmitting the signal based at least in part on the validated pseudo random sequence.

Clause 2. The method of clause 1 wherein the secure sequence validation information includes a metric and a corresponding threshold value and validating the pseudo random sequence includes obtaining a measurement value of the pseudo random sequence based on the metric and comparing the measurement value to the corresponding threshold value.

Clause 3. The method of clause 2 wherein the metric is an autocorrelation value.

Clause 4. The method of clause 2 wherein the metric is a peak average power ratio (PAPR).

Clause 5. The method of clause 2 wherein the metric is a peak-to-sidelobe measurement value.

Clause 6. The method of clause 1 wherein the pseudo random sequence is based on an Advanced Encryption Standard (AES).

Clause 7. The method of clause 1 wherein determining the secure sequence validation information includes exchanging one or more messages with a wireless node configured to receive the signal.

Clause 8. The method of clause 1 wherein determining the secure sequence validation information includes receiving the secure sequence validation information from a network server.

Clause 9. The method of clause 1 wherein the signal is a positioning reference signal.

Clause 10. The method of clause 1 wherein the signal is a ultrawideband signal.

Clause 11. The method of clause 1 wherein validating the pseudo random sequence includes discarding a first pseudo random sequence based on the secure sequence information, generating a second pseudo random sequence, and validating the second pseudo random sequence based on the secure sequence information.

Clause 12. The method of clause 11 wherein the second pseudo random sequence is generated based on changing a counter value, a plain text value, or a combination of both, wherein the counter value and the plain text value are utilized by a cryptographic algorithm configured to generate pseudo random sequences.

Clause 13. A method for receiving a signal based on a validated pseudo random sequence, comprising: determining secure sequence validation information; generating a pseudo random sequence: validating the pseudo random sequence based on the secure sequence information; and receiving the signal based at least in part on the validated pseudo random sequence.

Clause 14. The method of clause 13 wherein the secure sequence validation information includes a metric and a corresponding threshold value and validating the pseudo random sequence includes obtaining a measurement value of the pseudo random sequence based on the metric and comparing the measurement value to the corresponding threshold value.

Clause 15. The method of clause 14 wherein the metric is an autocorrelation value.

Clause 16. The method of clause 14 wherein the metric is a peak average power ratio (PAPR).

Clause 17. The method of clause 14 wherein the metric is a peak-to-sidelobe measurement value.

Clause 18. The method of clause 13 wherein the pseudo random sequence is based on an Advanced Encryption Standard (AES).

Clause 19. The method of clause 13 wherein determining the secure sequence validation information includes exchanging one or more messages with a wireless node configured to transmit the signal.

Clause 20. The method of clause 13 wherein determining the secure sequence validation information includes receiving the secure sequence validation information from a network server.

Clause 21. The method of clause 13 wherein the signal is a positioning reference signal.

Clause 22. The method of clause 13 wherein the signal is a ultrawideband signal.

Clause 23. The method of clause 13 wherein validating the pseudo random sequence includes discarding a first pseudo random sequence based on the secure sequence information, generating a second pseudo random sequence, and validating the second pseudo random sequence based on the secure sequence information.

Clause 24. The method of clause 23 wherein the second pseudo random sequence is generated based on changing a counter value, a plain text value, or a combination of both, wherein the counter value and the plain text value are utilized by a cryptographic algorithm configured to generate pseudo random sequences.

Clause 25. An apparatus, comprising: a memory: at least one transceiver; at least one processor communicatively coupled to the memory and the at least one transceiver, and configured to: determine secure sequence validation information; generate a pseudo random sequence: validate the pseudo random sequence based on the secure sequence information; and transmit a signal based at least in part on a validated pseudo random sequence.

Clause 26. The apparatus of clause 25 wherein the secure sequence validation information includes a metric and a corresponding threshold value and the at least one processor is further configured to obtain a measurement value of the pseudo random sequence based on the metric and compare the measurement value to the corresponding threshold value.

Clause 27. The apparatus of clause 26 wherein the metric is an autocorrelation value.

Clause 28. The apparatus of clause 26 wherein the metric is a peak average power ratio (PAPR).

Clause 29. The apparatus of clause 26 wherein the metric is a peak-to-sidelobe measurement value.

Clause 30. The apparatus of clause 25 wherein the pseudo random sequence is based on an Advanced Encryption Standard (AES).

Clause 31. The apparatus of clause 25 wherein the at least one processor is further configured to determine the secure sequence validation information by exchanging one or more messages with a wireless node configured to receive the signal.

Clause 32. The apparatus of clause 25 wherein the at least one processor is further configured to determine the secure sequence validation information by receiving the secure sequence validation information from a network server.

Clause 33. The apparatus of clause 25 wherein the signal is a positioning reference signal.

Clause 34. The apparatus of clause 25 wherein the signal is a ultrawideband signal.

Clause 35. The apparatus of clause 25 wherein, to validate the pseudo random sequence, the at least one processor is further configured to discard a first pseudo random sequence based on the secure sequence information, generate a second pseudo random sequence, and validate the second pseudo random sequence based on the secure sequence information.

Clause 36. The apparatus of clause 35 wherein, to generate the second pseudo random sequence, the at least one processor is further configured to change a counter value, a plain text value, or a combination of both, wherein the counter value and the plain text value are utilized by a cryptographic algorithm configured to generate pseudo random sequences.

Clause 37. An apparatus, comprising: a memory: at least one transceiver; at least one processor communicatively coupled to the memory and the at least one transceiver, and configured to: determine secure sequence validation information; generate a pseudo random sequence: validate the pseudo random sequence based on the secure sequence information; and receive a signal based at least in part on a validated pseudo random sequence.

Clause 38. The apparatus of clause 37 wherein the secure sequence validation information includes a metric and a corresponding threshold value and the at least one processor is further configured to obtain a measurement value of the pseudo random sequence based on the metric and compare the measurement value to the corresponding threshold value.

Clause 39. The apparatus of clause 38 wherein the metric is an autocorrelation value.

Clause 40. The apparatus of clause 38 wherein the metric is a peak average power ratio (PAPR).

Clause 41. The apparatus of clause 38 wherein the metric is a peak-to-sidelobe measurement value.

Clause 42. The apparatus of clause 37 wherein the pseudo random sequence is based on an Advanced Encryption Standard (AES).

Clause 43. The apparatus of clause 37 wherein, to determine the secure sequence validation information, the at least one processor is further configured to exchange one or more messages with a wireless node configured to transmit the signal.

Clause 44. The apparatus of clause 37 wherein, to determine the secure sequence validation information, the at least one processor is further configured to receive the secure sequence validation information from a network server.

Clause 45. The apparatus of clause 37 wherein the signal is a positioning reference signal.

Clause 46. The apparatus of clause 37 wherein the signal is a ultrawideband signal.

Clause 47. The apparatus of clause 37 wherein, to validating the pseudo random sequence, the at least one processor is further configured to: discard a first pseudo random sequence based on the secure sequence information, generate a second pseudo random sequence, and validate the second pseudo random sequence based on the secure sequence information.

Clause 48. The apparatus of clause 47 wherein, to generate the second pseudo random sequence, the at least one processor is further configured to change a counter value, a plain text value, or a combination of both, wherein the counter value and the plain text value are utilized by a cryptographic algorithm configured to generate pseudo random sequences.

Clause 49. An apparatus for transmitting a signal based on a validated pseudo random sequence, comprising: means for determining secure sequence validation information: means for generating a pseudo random sequence: means for validating the pseudo random sequence based on the secure sequence information; and means for transmitting the signal based at least in part on the validated pseudo random sequence.

Clause 50. An apparatus for receiving a signal based on a validated pseudo random sequence, comprising: means for determining secure sequence validation information; means for generating a pseudo random sequence; means for validating the pseudo random sequence based on the secure sequence information; and means for receiving the signal based at least in part on the validated pseudo random sequence.

Clause 51. A non-transitory processor-readable storage medium comprising processor-readable instructions configured to cause one or more processors to transmit a signal based on a validated pseudo random sequence, comprising code for: determining secure sequence validation information; generating a pseudo random sequence; validating the pseudo random sequence based on the secure sequence information; and transmitting the signal based at least in part on the validated pseudo random sequence.

Clause 52. A non-transitory processor-readable storage medium comprising processor-readable instructions configured to cause one or more processors to receive a signal based on a validated pseudo random sequence, comprising code for: determining secure sequence validation information; generating a pseudo random sequence; validating the pseudo random sequence based on the secure sequence information; and receiving the signal based at least in part on the validated pseudo random sequence.

The invention claimed is:

1. A method for transmitting a signal based at least in part on a validated pseudo random sequence, comprising:
- determining secure sequence validation information;
- generating a pseudo random sequence, wherein a counter value, a plain text value, or a combination thereof, is utilized by a cryptographic algorithm configured to generate pseudo random sequences;
- validating the pseudo random sequence based at least in part on the secure sequence validation information; and
- wirelessly transmitting the signal based at least in part on the validated pseudo random sequence.

2. The method of claim 1 wherein the secure sequence validation information includes a metric and a corresponding threshold value and validating the pseudo random sequence includes obtaining a measurement value of the pseudo random sequence based at least in part on the metric and comparing the measurement value to the corresponding threshold value.

3. The method of claim 2 wherein the metric is at least one of an autocorrelation value, a peak average power ratio (PAPR), and a peak-to-sidelobe measurement value.

4. The method of claim 1, wherein the pseudo random sequence is based at least in part on an Advanced Encryption Standard (AES).

5. The method of claim 1 wherein determining the secure sequence validation information includes exchanging one or more messages with a wireless node configured to receive the signal.

6. The method of claim 1 wherein determining the secure sequence validation information includes wirelessly receiving the secure sequence validation information from a network server.

7. The method of claim 1 wherein the signal is a positioning reference signal.

8. The method of claim 1 wherein the signal is a ultrawideband signal.

9. The method of claim 1 wherein validating the pseudo random sequence includes discarding a first pseudo random sequence based at least in part on the secure sequence validation information, generating a second pseudo random sequence, and validating the second pseudo random sequence based at least in part on the secure sequence validation information.

10. The method of claim 9, wherein the second pseudo random sequence is generated based at least in part on changing the counter value, the plain text value, or a combination of both.

11. A method for receiving a signal based at least in part on a validated pseudo random sequence, comprising:

determining secure sequence validation information;

generating a pseudo random sequence, wherein a counter value, a plain text value, or a combination thereof, is utilized by a cryptographic algorithm configured to generate pseudo random sequences;

validating the pseudo random sequence based at least in part on the secure sequence validation information; and wirelessly receiving the signal based at least in part on the validated pseudo random sequence.

12. The method of claim 11 wherein the secure sequence validation information includes a metric and a corresponding threshold value and validating the pseudo random sequence includes obtaining a measurement value of the pseudo random sequence based at least in part on the metric and comparing the measurement value to the corresponding threshold value.

13. The method of claim 12 wherein the metric is at least one of an autocorrelation value, a peak average power ratio (PAPR), and a peak-to-sidelobe measurement value.

14. The method of claim 11 wherein the pseudo random sequence is based at least in part on an Advanced Encryption Standard (AES).

15. The method of claim 11 wherein determining the secure sequence validation information includes exchanging one or more messages with a wireless node configured to transmit the signal.

16. The method of claim 11 wherein determining the secure sequence validation information includes wirelessly receiving the secure sequence validation information from a network server.

17. The method of claim 11 wherein the signal is a positioning reference signal.

18. The method of claim 11 wherein the signal is a ultrawideband signal.

19. The method of claim 11 wherein validating the pseudo random sequence includes discarding a first pseudo random sequence based at least in part on the secure sequence validation information, generating a second pseudo random sequence, and validating the second pseudo random sequence based at least in part on the secure sequence validation information.

20. The method of claim 19, wherein the second pseudo random sequence is generated based at least in part on changing the counter value, the plain text value, or a combination of both.

21. An apparatus, comprising:

a memory;

at least one transceiver; and at least one processor communicatively coupled to the memory and the at least one transceiver, and configured to:

determine secure sequence validation information;

generate a pseudo random sequence, wherein a counter value, a plain text value, or a combination thereof, is utilized by a cryptographic algorithm configured to generate pseudo random sequences;

validate the pseudo random sequence based at least in part on the secure sequence validation information; and wirelessly transmit a signal based at least in part on a validated pseudo random sequence.

22. The apparatus of claim 21 wherein the secure sequence validation information includes a metric and a corresponding threshold value and the at least one processor is further configured to obtain a measurement value of the pseudo random sequence based at least in part on the metric and compare the measurement value to the corresponding threshold value.

23. The apparatus of claim 21 wherein the pseudo random sequence is based at least in part on an Advanced Encryption Standard (AES).

24. The apparatus of claim 21 wherein, to validate the pseudo random sequence, the at least one processor is further configured to discard a first pseudo random sequence based at least in part on the secure sequence validation information, generate a second pseudo random sequence, and validate the second pseudo random sequence based at least in part on the secure sequence validation information.

25. The apparatus of claim 24, wherein, to generate the second pseudo random sequence, the at least one processor is further configured to change the counter value, the plain text value, or a combination of both.

26. An apparatus, comprising:

a memory;

at least one transceiver; and at least one processor communicatively coupled to the memory and the at least one transceiver, and configured to:

determine secure sequence validation information;

generate a pseudo random sequence, wherein a counter value, a plain text value, or a combination thereof, is utilized by a cryptographic algorithm configured to generate pseudo random sequences;

validate the pseudo random sequence based at least in part on the secure sequence validation information; and wirelessly receive a signal based at least in part on a validated pseudo random sequence.

27. The apparatus of claim 26 wherein the secure sequence validation information includes a metric and a corresponding threshold value and the at least one processor is further configured to obtain a measurement value of the pseudo random sequence based at least in part on the metric and compare the measurement value to the corresponding threshold value.

28. The apparatus of claim 26 wherein the signal is a positioning reference signal.

29. The apparatus of claim 26 wherein, to validate the pseudo random sequence, the at least one processor is further configured to: discard a first pseudo random sequence based at least in part on the secure sequence validation information, generate a second pseudo random sequence, and validate the second pseudo random sequence based at least in part on the secure sequence validation information.

30. The apparatus of claim 29 wherein, to generate the second pseudo random sequence, the at least one processor is further configured to change the counter value, the plain text value, or a combination of both.

* * * * *